US 010925271 B2

United States Patent
Huang

(10) Patent No.: US 10,925,271 B2
(45) Date of Patent: Feb. 23, 2021

(54) MULTI-LAYERED GRIP

(71) Applicant: Ben Huang, Huntington Beach, CA (US)

(72) Inventor: Ben Huang, Huntington Beach, CA (US)

( * ) Notice: Subject to any disclaimer, the term of this patent is extended or adjusted under 35 U.S.C. 154(b) by 166 days.

(21) Appl. No.: 15/607,306

(22) Filed: May 26, 2017

(65) Prior Publication Data

US 2017/0354132 A1    Dec. 14, 2017

Related U.S. Application Data

(63) Continuation of application No. 13/972,751, filed on Aug. 21, 2013, now Pat. No. 9,661,833, which is a
(Continued)

(51) Int. Cl.
*A01K 87/08* (2006.01)
*A63B 60/00* (2015.01)
(Continued)

(52) U.S. Cl.
CPC ............... *A01K 87/08* (2013.01); *A63B 60/00* (2015.10); *A63B 60/14* (2015.10); *A63B 60/06* (2015.10);
(Continued)

(58) Field of Classification Search
CPC ......... B29C 63/10; B29C 65/48; B29C 65/62; B29C 65/72; A63B 49/08; A63B 53/14;
(Continued)

(56) References Cited

U.S. PATENT DOCUMENTS

| 402,594 A | 5/1889 | Hook |
| 450,906 A | 4/1891 | Blakely |

(Continued)

FOREIGN PATENT DOCUMENTS

| CN | 2090283 | 12/1991 |
| CN | 2109404 U | 7/1992 |

(Continued)

OTHER PUBLICATIONS

A. Zosel, Adhesion and tack of polymers: Influence of mechanical properties and surface tension, Colloid & Polymer Science 263: 541-553 (1985) in 13 pages.
(Continued)

*Primary Examiner* — Philip C Tucker
*Assistant Examiner* — Brian R Slawski
(74) *Attorney, Agent, or Firm* — Knobbe, Martens, Olson & Bear, LLP

(57) ABSTRACT

Disclosed are grips and methods of making grips for use with the handle of an article, and in particular for use with fishing poles and golf clubs. Grips preferably include a multi-layered gripping member and an inner sleeve or mounting body. The gripping member can include an outer layer with a fabric layer coated and preferably saturated by polyurethane. The outer layer can be bonded to an inner layer to form the gripping member which is then attached to the sleeve. The sleeve can be ground from a starting block of material or may be injection molded. Also disclosed are handles including a connector configured to couple to a portion of a fishing pole. Such handles may include a multiple layers and can be selectively removed from the article. Methods are also provided for selectively coupling exchangeable handles to articles including fishing poles.

13 Claims, 25 Drawing Sheets

Related U.S. Application Data continuation-in-part of application No. 12/753,669, filed on Apr. 2, 2010, now Pat. No. 8,518,505, said application No. 13/972,751 is a continuation-in-part of application No. 12/948,637, filed on Nov. 17, 2010, now Pat. No. 8,590,205.

(60) Provisional application No. 61/168,546, filed on Apr. 10, 2009, provisional application No. 61/183,488, filed on Jun. 2, 2009, provisional application No. 61/262,511, filed on Nov. 18, 2009.

(51) Int. Cl.

| | | |
|---|---|---|
| *A63B 60/14* | (2015.01) | |
| *B29C 65/72* | (2006.01) | |
| *B29C 65/62* | (2006.01) | |
| *B29C 65/48* | (2006.01) | |
| *A63B 60/10* | (2015.01) | |
| *A63B 60/06* | (2015.01) | |
| *A63B 60/08* | (2015.01) | |

(52) U.S. Cl.
CPC .............. *A63B 60/08* (2015.10); *A63B 60/10* (2015.10); *A63B 2209/00* (2013.01); *B29C 65/48* (2013.01); *B29C 65/62* (2013.01); *B29C 65/72* (2013.01); *Y10T 156/10* (2015.01)

(58) Field of Classification Search
CPC ......... A63B 60/00; A63B 60/06; A63B 60/08; A63B 60/10; A63B 60/12; A63B 60/16; A63B 60/18; A63B 60/54; A63B 2209/00; Y10T 16/44; Y10T 16/466; Y10T 16/476; Y10T 74/0287; A01K 87/08; B29L 2031/463
USPC ....... 156/60, 91, 92, 93, 153, 184, 185, 187, 156/191, 193, 194, 196, 212, 213, 215, 156/217, 218, 247, 250, 256, 258, 278, 156/293, 294, 304.1, 304.5, 307.1, 307.3; 473/300, 301, 302, 303, 549, 551; 43/23; 16/421, 430, 436, DIG. 12; 74/558
See application file for complete search history.

(56) References Cited

U.S. PATENT DOCUMENTS

| | | | |
|---|---|---|---|
| 571,025 A | 11/1896 | Spamer | |
| 834,711 A | 10/1906 | Clarke et al. | |
| 979,266 A | 12/1910 | Dean | |
| 1,008,604 A | 11/1911 | Lake | |
| 1,017,565 A | 2/1912 | Lard | |
| 1,139,843 A | 5/1915 | Brown | |
| 1,345,505 A | 7/1920 | Persons | |
| 1,435,088 A | 11/1922 | Smith | |
| 1,480,056 A | 1/1924 | Flint | |
| 1,522,635 A | 1/1924 | Kraeuter | |
| 1,528,190 A | 3/1925 | Howe | |
| 1,617,972 A | 2/1927 | Wallace | |
| 1,701,856 A * | 2/1929 | Kraeuter | A63B 53/14 473/300 |
| 1,890,037 A | 11/1930 | Johnson | |
| 1,943,399 A | 1/1934 | Smith | |
| 2,000,295 A | 5/1935 | Oldham | |
| 2,002,535 A * | 5/1935 | Gagnier | A63B 53/14 473/300 |
| 2,010,627 A | 8/1935 | Dileo | |
| 2,086,062 A | 7/1937 | Bray | |
| 2,091,512 A | 8/1937 | Marsh | |
| 2,103,889 A | 12/1937 | Brisick | |
| 2,115,119 A | 4/1938 | Park | |
| 2,149,911 A | 3/1939 | East | |
| 2,206,056 A | 7/1940 | Sheesley | |
| 2,221,421 A | 11/1940 | Curry | |
| 2,225,839 A | 12/1940 | Moore | |
| 2,226,866 A * | 12/1940 | Lipschultz | B62D 1/06 74/558 |
| 2,302,844 A | 11/1942 | Ebbott | |
| 2,358,176 A | 9/1944 | MacDonald | |
| 2,446,622 A * | 8/1948 | Turner | C14B 1/00 69/21 |
| 2,449,575 A | 9/1948 | Wilhelm | |
| 2,523,637 A | 9/1950 | Stanfield et al. | |
| 2,592,878 A | 4/1952 | Esposito | |
| 2,671,660 A | 3/1954 | Goodwin | |
| 2,690,338 A | 9/1954 | Brocke | |
| 2,772,090 A | 11/1956 | Brandon | |
| 2,826,852 A | 3/1958 | Wardrip | |
| 2,830,399 A | 4/1958 | Davis | |
| 2,836,420 A | 5/1958 | Lamkin et al. | |
| 2,934,285 A | 4/1960 | Niehaus | |
| 2,984,486 A | 5/1961 | Jones | |
| 3,028,283 A * | 4/1962 | Lundgren | A63B 53/14 264/245 |
| 3,059,816 A | 10/1962 | Goldstein | |
| 3,071,023 A | 1/1963 | Herr et al. | |
| 3,073,055 A | 1/1963 | Edwards et al. | |
| 3,087,729 A | 4/1963 | Sullivan | |
| 3,095,198 A | 6/1963 | Gasche | |
| 3,140,873 A | 7/1964 | Goodwin | |
| 3,150,460 A | 9/1964 | Dees | |
| 3,157,723 A | 11/1964 | Hochberg | |
| 3,252,706 A | 5/1966 | Rosasco, Sr. | |
| 3,266,966 A | 8/1966 | Patchell | |
| 3,295,244 A | 1/1967 | Kuntze | |
| 3,311,375 A | 3/1967 | Onions | |
| 3,366,384 A | 1/1968 | Lamkin et al. | |
| 3,368,811 A | 2/1968 | Finney | |
| 3,478,138 A | 11/1969 | Friesner | |
| 3,503,784 A | 3/1970 | Okayama et al. | |
| 3,582,456 A | 6/1971 | Stolki | |
| 3,606,325 A | 9/1971 | Lamkin et al. | |
| 3,609,114 A | 9/1971 | Bright, Sr. | |
| 3,697,315 A | 10/1972 | Mine | |
| 3,698,118 A | 10/1972 | Schultz | |
| 3,811,215 A | 5/1974 | Fleischer | |
| 3,848,480 A | 11/1974 | Oseroff et al. | |
| 3,857,745 A | 12/1974 | Grausch et al. | |
| 3,876,320 A | 4/1975 | Phillipson | |
| 3,883,978 A | 5/1975 | Ohmura | |
| 3,922,402 A | 11/1975 | Shimamura et al. | |
| 3,964,340 A | 6/1976 | Antonio et al. | |
| 3,973,348 A | 8/1976 | Shell | |
| 3,975,855 A | 8/1976 | McKeown | |
| 3,992,021 A | 11/1976 | Tobin | |
| 4,012,039 A | 3/1977 | Yerke | |
| 4,015,851 A | 4/1977 | Pennell | |
| 4,050,179 A | 9/1977 | Johnson | |
| 4,052,061 A | 10/1977 | Stewart | |
| 4,052,768 A | 10/1977 | Yamazaki et al. | |
| 4,053,676 A | 10/1977 | Kaminstein | |
| 4,083,141 A | 4/1978 | Shedd et al. | |
| 4,117,568 A | 10/1978 | Bullock | |
| 4,133,529 A | 1/1979 | Gambino | |
| 4,137,360 A | 1/1979 | Reischl | |
| 4,138,075 A | 2/1979 | Korten | |
| 4,138,518 A | 2/1979 | Sammak et al. | |
| 4,155,517 A | 5/1979 | Sazaki | |
| 4,195,837 A | 4/1980 | Poulin | |
| 4,205,112 A | 5/1980 | Mervin | |
| 4,216,251 A | 8/1980 | Nishimura et al. | |
| 4,220,054 A | 9/1980 | Kuhlman | |
| 4,250,135 A | 2/1981 | Orsini | |
| 4,261,567 A | 4/1981 | Uffindell | |
| 4,284,275 A | 8/1981 | Fletcher | |
| 4,317,568 A | 3/1982 | Green | |
| 4,347,280 A * | 8/1982 | Lau | A63B 49/08 428/304.4 |
| 4,358,499 A | 11/1982 | Hill | |
| 4,365,807 A | 12/1982 | Melby | |
| 4,373,718 A | 2/1983 | Schmidt | |
| 4,398,369 A | 8/1983 | Wiebe | |

(56) References Cited

U.S. PATENT DOCUMENTS

| | | | |
|---|---|---|---|
| 4,448,922 A | 5/1984 | McCartney | |
| 4,453,332 A | 6/1984 | Wightman | |
| 4,485,580 A | 12/1984 | Ohmura | |
| 4,524,484 A | 6/1985 | Graham | |
| 4,535,561 A | 8/1985 | Hlava | |
| 4,535,649 A | 8/1985 | Stahel | |
| 4,559,735 A | 12/1985 | Batick, Jr. | |
| 4,582,459 A | 4/1986 | Benit | |
| 4,613,537 A * | 9/1986 | Krupper | A63B 49/08 428/192 |
| 4,637,157 A | 1/1987 | Collins | |
| 4,646,460 A | 3/1987 | Rumbaugh | |
| 4,648,196 A | 3/1987 | Moody | |
| 4,651,461 A | 3/1987 | Williams | |
| 4,651,991 A | 3/1987 | McDuff | |
| 4,662,415 A | 5/1987 | Proutt | |
| 4,697,377 A | 10/1987 | Martin | |
| 4,702,032 A | 10/1987 | Ohmura | |
| 4,732,638 A | 3/1988 | Baker et al. | |
| 4,738,046 A | 4/1988 | Fraylick et al. | |
| 4,747,227 A | 5/1988 | Kress | |
| 4,765,856 A | 8/1988 | Doubt | |
| 4,821,447 A | 4/1989 | Nakayama et al. | |
| 4,830,306 A | 5/1989 | Tsunoda et al. | |
| 4,839,981 A | 6/1989 | Yasui | |
| 4,845,882 A | 7/1989 | Collins | |
| 4,850,130 A | 7/1989 | Childre et al. | |
| 4,864,764 A | 9/1989 | Yamato | |
| 4,878,667 A | 11/1989 | Tosti | |
| 4,919,420 A | 4/1990 | Sato | |
| 4,941,232 A | 7/1990 | Decker et al. | |
| 4,971,837 A | 11/1990 | Martz et al. | |
| 5,024,866 A | 6/1991 | Goode | |
| 5,026,872 A | 6/1991 | Kohli | |
| 5,055,340 A * | 10/1991 | Matsumura | A63B 49/08 428/172 |
| 5,088,225 A | 2/1992 | Yamamoto | |
| 5,118,107 A | 6/1992 | Bucher | |
| 5,123,646 A | 6/1992 | Overby et al. | |
| 5,127,650 A | 7/1992 | Schneller | |
| 5,145,210 A | 9/1992 | Lennon | |
| 5,150,853 A | 9/1992 | Bernard et al. | |
| D336,322 S | 6/1993 | Poincenot et al. | |
| 5,220,707 A | 6/1993 | Newman, Sr. et al. | |
| 5,261,665 A | 11/1993 | Downey | |
| 5,266,991 A | 11/1993 | McAtee, Jr. | |
| 5,267,487 A * | 12/1993 | Falco | B62D 1/06 428/36.1 |
| 5,322,290 A | 6/1994 | Minami | |
| 5,330,603 A | 7/1994 | Payne | |
| 5,343,776 A * | 9/1994 | Falco | B25G 1/01 428/34.1 |
| 5,348,303 A | 9/1994 | Swissheim | |
| 5,374,059 A | 12/1994 | Huang | |
| 5,396,727 A | 3/1995 | Furuya et al. | |
| 5,397,123 A | 3/1995 | Huang | |
| 5,427,376 A | 6/1995 | Cummings et al. | |
| 5,461,818 A | 10/1995 | Balkcom | |
| 5,469,601 A | 11/1995 | Jackson | |
| 5,474,802 A | 12/1995 | Shimoda et al. | |
| 5,480,146 A | 1/1996 | Comer | |
| 5,485,996 A | 1/1996 | Niksich | |
| 5,503,579 A | 4/1996 | Curran et al. | |
| 5,511,445 A | 4/1996 | Hildebrandt | |
| D369,641 S | 5/1996 | Asano et al. | |
| 5,522,169 A | 6/1996 | Heller | |
| 5,523,125 A | 6/1996 | Kennedy et al. | |
| 5,535,539 A | 7/1996 | Vetre | |
| 5,537,773 A | 7/1996 | Matsubara et al. | |
| D373,404 S | 9/1996 | Atherton et al. | |
| 5,552,207 A * | 9/1996 | Porter | D03D 9/00 428/109 |
| 5,557,875 A | 9/1996 | Testa | |
| 5,570,884 A | 11/1996 | Carps | |
| 5,571,050 A | 11/1996 | Huang | |
| 5,577,722 A | 11/1996 | Glassberg | |
| 5,584,482 A | 12/1996 | Huang | |
| 5,595,544 A | 1/1997 | Roelke | |
| 5,611,153 A | 3/1997 | Fisher et al. | |
| 5,611,533 A | 3/1997 | Williams | |
| 5,618,041 A | 4/1997 | Huang | |
| 5,624,116 A | 4/1997 | Yeh | |
| 5,626,527 A | 5/1997 | Eberlein | |
| 5,634,859 A | 6/1997 | Nesbitt | |
| 5,636,560 A | 6/1997 | Paul | |
| 5,645,501 A | 7/1997 | Huang | |
| 5,653,643 A | 8/1997 | Falone et al. | |
| 5,660,344 A | 8/1997 | Testa | |
| 5,671,923 A | 9/1997 | Huang | |
| 5,690,566 A | 11/1997 | Bracho | |
| 5,695,418 A | 12/1997 | Huang | |
| 5,697,184 A | 12/1997 | Heller | |
| D391,316 S | 2/1998 | Morris et al. | |
| 5,730,662 A | 3/1998 | Rens | |
| 5,730,669 A | 3/1998 | Huang | |
| 5,732,602 A | 3/1998 | Schwartz | |
| 5,743,577 A | 4/1998 | Newman, Jr. et al. | |
| 5,753,568 A | 5/1998 | Shimano et al. | |
| 5,766,720 A | 6/1998 | Yamagishi et al. | |
| 5,771,552 A | 6/1998 | Karner et al. | |
| 5,772,524 A | 6/1998 | Huang | |
| 5,781,963 A | 7/1998 | Maru et al. | |
| 5,785,607 A | 7/1998 | Huang | |
| 5,797,813 A | 8/1998 | Huang | |
| 5,803,828 A | 9/1998 | Huang | |
| 5,813,921 A | 9/1998 | Huang | |
| 5,816,933 A | 10/1998 | Huang | |
| 5,816,934 A | 10/1998 | Huang | |
| 5,827,129 A | 10/1998 | Huang | |
| 5,839,983 A | 11/1998 | Kramer | |
| 5,851,632 A | 12/1998 | Chen et al. | |
| 5,857,929 A | 1/1999 | Huang | |
| 5,867,868 A | 2/1999 | Ward | |
| 5,890,260 A | 4/1999 | Gaunt | |
| 5,890,313 A | 4/1999 | Collins | |
| 5,890,972 A | 4/1999 | Huang | |
| 5,895,329 A | 4/1999 | Huang | |
| 5,910,054 A | 6/1999 | Huang | |
| 5,921,488 A | 7/1999 | DeGrenier | |
| 5,924,941 A | 7/1999 | Hagey | |
| 5,934,587 A | 8/1999 | Yamaguchi | |
| 5,960,578 A * | 10/1999 | Yasui | A01K 77/00 43/23 |
| 5,997,421 A | 12/1999 | Huang | |
| 6,022,278 A | 2/2000 | Vela | |
| 6,024,661 A * | 2/2000 | Guenther | A63B 41/08 473/599 |
| 6,036,607 A | 3/2000 | Finegan | |
| 6,048,275 A | 4/2000 | Gedeon | |
| 6,048,612 A * | 4/2000 | Dozier | A63B 49/08 428/355 R |
| 6,067,740 A | 5/2000 | Alley | |
| 6,112,618 A | 9/2000 | Yates | |
| 6,115,955 A | 9/2000 | Sledge | |
| 6,148,482 A | 11/2000 | Maraman, Jr. | |
| 6,197,392 B1 | 3/2001 | Jones | |
| 6,203,308 B1 | 3/2001 | Huang | |
| D443,019 S | 5/2001 | Kang et al. | |
| 6,226,836 B1 | 5/2001 | Yasui | |
| 6,230,341 B1 | 5/2001 | Dudley | |
| 6,244,975 B1 | 6/2001 | Huang | |
| 6,261,191 B1 | 7/2001 | Chen | |
| 6,270,717 B1 * | 8/2001 | Tremblay | B01D 39/086 222/594 |
| 6,314,617 B1 | 11/2001 | Hastings | |
| 6,357,165 B1 | 3/2002 | Lu | |
| 6,360,475 B1 | 3/2002 | Lepage et al. | |
| 6,361,450 B1 | 3/2002 | Huang | |
| RE37,702 E | 5/2002 | Huang | |
| 6,381,898 B1 | 5/2002 | Lee | |
| 6,386,989 B1 | 5/2002 | Huang | |
| 6,438,890 B1 | 8/2002 | Yamamoto et al. | |
| D463,520 S | 9/2002 | Ulrich | |

(56) References Cited

U.S. PATENT DOCUMENTS

| | | |
|---|---|---|
| 6,449,803 B1 | 9/2002 | McConchie |
| 6,503,153 B2 | 1/2003 | Wang |
| 6,506,128 B1 | 1/2003 | Bloom, Jr. |
| 6,511,732 B1 | 1/2003 | Chao |
| 6,551,198 B2 | 4/2003 | Huang |
| 6,558,270 B2 | 5/2003 | Kwitek |
| 6,609,325 B2 | 8/2003 | Harris |
| 6,610,382 B1 | 8/2003 | Kobe et al. |
| 6,627,027 B2 | 9/2003 | Huang |
| 6,629,382 B2 | 10/2003 | Irrgang et al. |
| 6,629,901 B2 | 10/2003 | Huang |
| 6,635,688 B2 | 10/2003 | Simpson |
| 6,641,488 B2 | 11/2003 | Huang |
| 6,652,398 B2 | 11/2003 | Falone et al. |
| 6,656,054 B2 | 12/2003 | Ulrich |
| 6,656,057 B2 | 12/2003 | Manual et al. |
| 6,663,500 B2 | 12/2003 | Huang |
| 6,666,777 B1 | 12/2003 | Falone et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,815,028 B2 | 11/2004 | Huang |
| 6,827,656 B1 | 12/2004 | Hoeflich et al. |
| 6,843,732 B1 | 1/2005 | Huang |
| 6,846,759 B1 | 1/2005 | Copperwheat |
| 6,855,651 B2 | 2/2005 | Yu |
| 6,887,061 B2 | 5/2005 | Donovan et al. |
| 6,908,400 B2 | 6/2005 | Chu et al. |
| 6,857,971 B2 | 11/2005 | Huang |
| 6,973,750 B1 | 12/2005 | Kim |
| 6,974,626 B2 | 12/2005 | Horacek |
| 7,008,582 B2 | 3/2006 | Chen |
| 7,025,690 B2 | 4/2006 | Nam |
| 7,048,644 B2 | 5/2006 | Wang |
| D524,390 S | 7/2006 | Tuerschmann |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| 7,159,355 B2 | 1/2007 | Ohmura |
| D538,868 S | 3/2007 | Norton et al. |
| D538,869 S | 3/2007 | Wang et al. |
| 7,186,189 B2 | 3/2007 | Huang |
| 7,195,568 B2 | 3/2007 | Huang |
| 7,219,395 B2 | 5/2007 | Bigolin |
| D547,406 S | 7/2007 | Noyes et al. |
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |
| 7,404,770 B2 | 7/2008 | Huang |
| D576,240 S | 9/2008 | Chen |
| D576,241 S | 9/2008 | Chen |
| D579,075 S | 10/2008 | Sekimoto et al. |
| 7,438,646 B2 | 10/2008 | Huang |
| D581,001 S | 11/2008 | Chen |
| D581,002 S | 11/2008 | Chen |
| 7,448,957 B2 | 11/2008 | Huang |
| 7,448,958 B2 | 11/2008 | Huang |
| 7,458,903 B2 | 12/2008 | Wang et al. |
| 7,470,199 B2 | 12/2008 | Huang |
| 7,491,133 B2 | 2/2009 | Huang |
| D590,465 S | 4/2009 | Chen |
| 7,527,564 B2 | 5/2009 | Huang |
| 7,566,375 B2 | 7/2009 | Huang |
| 7,585,230 B2 | 9/2009 | Huang |
| 7,614,577 B2 | 11/2009 | Ochiai et al. |
| 7,621,067 B2 | 11/2009 | Ito |
| D609,772 S | 2/2010 | Tohma et al. |
| D616,516 S | 5/2010 | Chen |
| 7,749,094 B2 | 7/2010 | Chen |
| 7,770,321 B2 | 8/2010 | Huang |
| D631,118 S | 1/2011 | Chen |
| 7,862,445 B2 | 1/2011 | Huang |
| 7,862,446 B2 | 1/2011 | Huang |
| D634,803 S | 3/2011 | Chen |
| 7,980,961 B2 | 7/2011 | Huang |
| 8,003,171 B2 | 8/2011 | Huang |
| 8,123,627 B2 | 2/2012 | Huang |
| D661,774 S | 6/2012 | Nago et al. |
| 8,201,357 B2 | 6/2012 | Huang |
| 8,360,898 B2 | 1/2013 | Huang |
| 8,424,236 B2 | 4/2013 | Huang |
| 8,435,133 B2 | 5/2013 | Huang |
| 8,464,609 B2 | 6/2013 | Shiu et al. |
| 8,499,487 B2 | 8/2013 | Huang |
| 8,518,505 B2 | 8/2013 | Huang |
| 8,590,205 B2 | 11/2013 | Huang |
| D695,379 S | 12/2013 | Kano et al. |
| 8,617,664 B2 | 12/2013 | Huang |
| 8,845,448 B2 | 9/2014 | Huang |
| D724,174 S | 3/2015 | Nago |
| 8,966,809 B2 | 3/2015 | Huang |
| 9,114,295 B2 | 8/2015 | Huang |
| 9,144,716 B2 | 9/2015 | Huang |
| 9,440,128 B2 | 9/2016 | Huang |
| 9,598,099 B2 | 3/2017 | Bertani |
| D788,256 S | 5/2017 | Savakis et al. |
| 9,661,833 B2 | 5/2017 | Huang |
| D802,708 S | 11/2017 | Savakis |
| 9,827,645 B2 | 11/2017 | Huang |
| 10,040,091 B2 | 8/2018 | Huang |
| 10,102,833 B1* | 10/2018 | May ................... G10D 13/26 |
| 10,112,087 B2 | 10/2018 | Huang |
| D844,744 S | 4/2019 | Huang et al. |
| D847,298 S | 4/2019 | Huang et al. |
| 10,349,644 B2 | 7/2019 | Ikebukuro |
| 10,653,124 B2 | 5/2020 | Huang et al. |
| 2001/0023622 A1* | 9/2001 | Testa ................... B29C 70/545 |
| | | 74/558 |
| 2001/0046905 A1* | 11/2001 | Huang ................... A63B 53/14 |
| | | 473/300 |
| 2002/0025857 A1 | 2/2002 | Saito et al. |
| 2002/0028264 A1 | 3/2002 | Hoopman et al. |
| 2002/0028325 A1 | 3/2002 | Simpson |
| 2002/0061787 A1 | 5/2002 | Huang |
| 2002/0082109 A1* | 6/2002 | Wang ..................... A63B 60/14 |
| | | 473/300 |
| 2002/0119270 A1* | 8/2002 | Daniel, Jr. ............. B25G 1/102 |
| | | 428/36.9 |
| 2002/0142858 A1 | 10/2002 | Chen |
| 2002/0142900 A1 | 10/2002 | Wang |
| 2002/0151373 A1 | 10/2002 | Beauregard |
| 2002/0173371 A1 | 11/2002 | Lamkin et al. |
| 2003/0027475 A1* | 2/2003 | Yu ......................... B32B 27/12 |
| | | 442/149 |
| 2003/0040384 A1 | 2/2003 | Falone et al. |
| 2003/0045370 A1 | 3/2003 | Jaw |
| 2003/0062654 A1 | 4/2003 | Lamkin |
| 2003/0139223 A1 | 7/2003 | Ulrich et al. |
| 2003/0148836 A1 | 8/2003 | Falone et al. |
| 2003/0150081 A1 | 8/2003 | Wang |
| 2003/0216192 A1 | 11/2003 | Chu |
| 2003/0228930 A1 | 12/2003 | Huang |
| 2004/0029645 A1 | 2/2004 | Chen |
| 2004/0029646 A1 | 2/2004 | Chu et al. |
| 2004/0031128 A1 | 2/2004 | Chen |
| 2004/0050205 A1* | 3/2004 | Putnam ................. B62K 21/26 |
| | | 74/558 |
| 2004/0088900 A1 | 5/2004 | Irrgang et al. |
| 2004/0109980 A1 | 6/2004 | Chen et al. |
| 2004/0123429 A1 | 7/2004 | Wang |
| 2004/0185958 A1 | 9/2004 | Huang |
| 2004/0211108 A1 | 10/2004 | Ezuka |
| 2004/0248664 A1 | 12/2004 | Billings |
| 2005/0123723 A1* | 6/2005 | Wang ..................... B32B 5/022 |
| | | 428/140 |

(56) References Cited

U.S. PATENT DOCUMENTS

| | | | |
|---|---|---|---|
| 2005/0148401 A1 | 7/2005 | Huang | |
| 2005/0209017 A1 | 9/2005 | Chu et al. | |
| 2005/0221909 A1 | 10/2005 | Nam | |
| 2005/0229285 A1 | 10/2005 | Chung | |
| 2005/0276925 A1 | 12/2005 | Su | |
| 2005/0282004 A1* | 12/2005 | Jaw | B32B 27/12 428/354 |
| 2005/0287329 A1 | 12/2005 | Lai | |
| 2006/0157901 A1* | 7/2006 | Vito | A61F 13/069 267/136 |
| 2006/0172815 A1 | 8/2006 | Chu | |
| 2006/0188681 A1 | 8/2006 | Wang | |
| 2006/0230669 A1 | 10/2006 | Markley et al. | |
| 2006/0252571 A1 | 11/2006 | Wang | |
| 2006/0264268 A1 | 11/2006 | Huang | |
| 2006/0287123 A1 | 12/2006 | Wang | |
| 2007/0032309 A1 | 2/2007 | Chang | |
| 2007/0072696 A1 | 3/2007 | Chen | |
| 2007/0149307 A1 | 6/2007 | Huang | |
| 2007/0167252 A1* | 7/2007 | Jaw | A63B 53/14 473/300 |
| 2007/0270234 A1* | 11/2007 | Huang | A63B 60/08 473/300 |
| 2008/0014412 A1 | 1/2008 | Hortnagl et al. | |
| 2008/0039226 A1 | 2/2008 | Chi | |
| 2008/0040890 A1 | 2/2008 | Chang | |
| 2008/0120893 A1 | 5/2008 | Keys et al. | |
| 2008/0172839 A1 | 7/2008 | Wang | |
| 2008/0229646 A1 | 9/2008 | Huang | |
| 2008/0244956 A1 | 10/2008 | Gant et al. | |
| 2009/0035543 A1 | 2/2009 | Vito et al. | |
| 2009/0158882 A1* | 6/2009 | Yu | A63B 49/08 74/551.1 |
| 2009/0258721 A1 | 10/2009 | Huang | |
| 2009/0258722 A1 | 10/2009 | Huang | |
| 2012/0129624 A1 | 5/2012 | Ito et al. | |
| 2013/0255131 A1 | 10/2013 | Abbey et al. | |
| 2013/0283665 A1 | 10/2013 | Poe et al. | |
| 2014/0366327 A1 | 12/2014 | Huang | |
| 2015/0181851 A1 | 7/2015 | Akiba et al. | |
| 2016/0192629 A1 | 7/2016 | Choi | |
| 2016/0338331 A1 | 11/2016 | Norsworthy | |
| 2017/0013816 A1 | 1/2017 | Huang | |
| 2017/0112113 A1 | 4/2017 | Huang | |
| 2018/0154494 A1 | 6/2018 | Huang | |
| 2018/0317470 A1 | 11/2018 | Huang | |
| 2019/0193106 A1 | 6/2019 | Huang | |
| 2019/0232131 A1 | 8/2019 | Huang | |

FOREIGN PATENT DOCUMENTS

| | | | |
|---|---|---|---|
| CN | 2139008 Y | 7/1993 | |
| CN | 2163667 Y | 5/1994 | |
| CN | 2288744 | 8/1998 | |
| CN | 1332022 A | 7/2000 | |
| CN | 2438768 | 7/2001 | |
| CN | 2444645 | 8/2001 | |
| CN | ZL 02254450 | 9/2002 | |
| CN | 2544761 | 4/2003 | |
| CN | 2566903 Y | 8/2003 | |
| CN | 2576294 | 10/2003 | |
| CN | 2596752 Y | 1/2004 | |
| CN | 1531983 | 9/2004 | |
| CN | 2659497 Y | 12/2004 | |
| CN | 101005759 | 1/2011 | |
| CN | 203801538 | 9/2014 | |
| DE | 36 44 674 A1 | 7/1988 | |
| DE | 92 18 550 U1 | 8/1994 | |
| DE | 20 2013 008 537 | 1/2014 | |
| EP | 0 391 166 | 10/1990 | |
| EP | 0 633 113 | 1/1995 | |
| EP | 1 435 256 | 1/2003 | |
| EP | 1 371 397 | 12/2003 | |
| EP | 1 464 365 A2 | 10/2004 | |
| EP | 1 464 365 A3 | 11/2004 | |
| EP | 1 738 808 | 1/2007 | |
| EP | 2 888 939 | 3/2019 | |
| FR | 2 731 402 A3 | 9/1996 | |
| GB | 443228 A * | 2/1936 | A63B 60/14 |
| GB | 674697 | 6/1952 | |
| GB | 1 251 360 | 10/1971 | |
| GB | 2 017 471 | 10/1979 | |
| GB | 2 192 550 A | 1/1988 | |
| GB | 2 264 062 | 8/1993 | |
| JP | S57-111689 U | 12/1955 | |
| JP | 53-12061 | 2/1978 | |
| JP | 55-43008 | 3/1980 | |
| JP | 60-61067 | 4/1985 | |
| JP | 3112575 | 5/1991 | |
| JP | H04-077250 | 3/1992 | |
| JP | 07-41731 | 2/1995 | |
| JP | 3010205 | 2/1995 | |
| JP | H09-056850 | 3/1997 | |
| JP | H09-275858 | 10/1997 | |
| JP | 3061769 U | 6/1999 | |
| JP | 2000-093050 | 4/2000 | |
| JP | 3076015 | 12/2000 | |
| JP | 2001-057831 | 3/2001 | |
| JP | 2001-120125 | 5/2001 | |
| JP | 2001-157533 | 6/2001 | |
| JP | 3081404 | 8/2001 | |
| JP | 2001-269088 | 10/2001 | |
| JP | 2001-275523 | 10/2001 | |
| JP | 2002-028264 | 1/2002 | |
| JP | 2002-119180 | 4/2002 | |
| JP | 2002-125534 | 5/2002 | |
| JP | 2002-218869 | 8/2002 | |
| JP | 2003-070396 | 3/2003 | |
| JP | 2003-153724 | 5/2003 | |
| JP | 2003-274813 | 9/2003 | |
| JP | 2004-201570 | 7/2004 | |
| JP | 2004-222655 | 8/2004 | |
| JP | 2004-236515 | 8/2004 | |
| JP | 2005-130767 | 5/2005 | |
| JP | 2005-177464 | 7/2005 | |
| JP | 2008-245645 | 10/2005 | |
| JP | 2006-204261 | 8/2006 | |
| JP | 2006-223186 | 8/2006 | |
| JP | 2006-254822 | 9/2006 | |
| JP | 2007-195489 | 8/2007 | |
| JP | 2008-017711 | 1/2008 | |
| JP | 2008-029297 | 2/2008 | |
| JP | 2008-029298 | 2/2008 | |
| JP | 2009-219408 | 10/2009 | |
| JP | 2009-240251 | 10/2009 | |
| JP | 2010-273587 | 12/2010 | |
| JP | 2011-067122 | 4/2011 | |
| JP | 5506161 | 5/2014 | |
| JP | 6210740 | 10/2017 | |
| JP | 6543554 | 7/2019 | |
| KR | 10-2007-0078047 | 7/2007 | |
| KR | 10-2008-0112484 | 12/2008 | |
| TW | 194957 | 1/1992 | |
| TW | 205010 | 5/1993 | |
| TW | 224366 | 5/1994 | |
| TW | 367870 | 8/1999 | |
| TW | 500036 | 8/2002 | |
| TW | 091212176 | 8/2002 | |
| TW | 557809 | 10/2003 | |
| TW | 559099 | 10/2003 | |
| TW | 200400843 | 1/2004 | |
| TW | 577340 | 2/2004 | |
| TW | 226231 | 1/2005 | |
| TW | M321797 | 11/2007 | |
| TW | M350370 | 2/2009 | |
| WO | WO 2005/115563 | 12/2005 | |
| WO | WO 2008/116183 | 9/2008 | |

OTHER PUBLICATIONS

European Search Report, European Application No. 10250739.9 dated Sep. 21, 2010.

(56) References Cited

OTHER PUBLICATIONS

Photo of the inner surface of a dark grey felt layer with polyurethane layered on an outer surface thereof taken Jan. 15, 2013.
Photo of the inner surface of a white felt layer with polyurethane layered on an outer surface thereof taken Feb. 14, 2013.
Taiwan Search Report in TW 099111165 dated Mar. 24, 2016 in 1 page.
The Random House College Dictionary, Revised Edition, 1975, p. 1233, definition of skive.
U.S. Appl. No. 09/901,747, filed Jul. 9, 2001, (U.S. Pub. No. 2001/0046905), abandoned.
U.S. Appl. No. 10/167,216, filed Jun. 11, 2002, now U.S. Pat. No. 7,137,904, issued Nov. 21, 2006.
U.S. Appl. No. 10/348,389, filed Jan. 21, 2003, now U.S. Pat. No. 6,733,401, issued May 11, 2004.
U.S. Appl. No. 10/392,480, filed Mar. 18, 2003, now U.S. Pat. No. 6,857,971, issued Feb. 22, 2005.
U.S. Appl. No. 10/608,598, filed Jun. 27, 2003, (U.S. Pub. No. 2004-0266546 A1), abandoned.
U.S. Appl. No. 10/746,764, filed Dec. 23, 2003, now U.S. Pat. No. 6,843,732, issued Jan. 18, 2005.
U.S. Appl. No. 10/785,379, filed Feb. 24, 2004, now U.S. Pat. No. 7,374,498, issued May 20, 2008.
U.S. Appl. No. 10/827,095, filed Apr. 19, 2004, now U.S. Pat. No. 7,195,568, issued Mar. 27, 2007.
U.S. Appl. No. 10/875,035, filed Jun. 23, 2004, now U.S. Pat. No. 7,585,230, issued Sep. 8, 2009.
U.S. Appl. No. 11/029,328, filed Jan. 5, 2005, (U.S. Pub. No. 2005-0148401 A1), abandoned.
U.S. Appl. No. 11/062,046, filed Feb. 18, 2005, now U.S. Pat. No. 7,470,199, issued Dec. 30, 2008.
U.S. Appl. No. 11/131,832, filed May 18, 2005, now U.S. Pat. No. 7,527,564, issued May 5, 2009.
U.S. Appl. No. 11/172,770, filed Jul. 1, 2005, now U.S. Pat. No. 7,186,189, issued Mar. 6, 2007.
U.S. Appl. No. 11/412,196, filed Apr. 25, 2006, (U.S. Pub. No. 2006-0264268 A1), abandoned.
U.S. Appl. No. 11/413,411, filed Apr. 28, 2006, now U.S. Pat. No. 7,344,448, issued Mar. 18, 2008.
U.S. Appl. No. 11/416,364, filed May 1, 2006, now U.S. Pat. No. 7,438,646, issued Oct. 21, 2008.
U.S. Appl. No. 11/417,401, filed May 3, 2006, now U.S. Pat. No. 7,491,133, issued Feb. 17, 2009.
U.S. Appl. No. 11/417,555, filed May 3, 2006, now U.S. Pat. No. 7,404,770, issued Jul. 29, 2008.
U.S. Appl. No. 11/417,623, filed May 3, 2006, now U.S. Pat. No. 7,566,375, issued Jul. 28, 2009.
U.S. Appl. No. 11/417,643, filed May 3, 2006, now U.S. Pat. No. 7,448,957, issued Nov. 11, 2008.
U.S. Appl. No. 11/417,696, filed Mar. 5, 2006, now U.S. Pat. No. 7,448,958, issued Nov. 11, 2008.
U.S. Appl. No. 11/438,808, filed May 22, 2006, now U.S. Pat. No. 7,347,792, issued Mar. 25, 2008.
U.S. Appl. No. 11/682,264, filed Mar. 5, 2007, now U.S. Pat. No. 7,980,961, issued Jul. 19, 2011.
U.S. Appl. No. 11/689,452, filed Mar. 21, 2007, now U.S. Pat. No. 7,862,445, issued Jan. 4, 2011.
U.S. Appl. No. 11/838,670, filed Aug. 14, 2007, now U.S. Pat. No. 7,862,446, issued Jan. 4, 2011.
U.S. Appl. No. 12/045,639, filed Mar. 10, 2008, now U.S. Pat. No. 7,770,321, issued Aug. 10, 2010.
U.S. Appl. No. 12/055,289, filed Mar. 25, 2008, now U.S. Pat. No. 8,003,171, issued Aug. 23, 2011.
U.S. Appl. No. 12/123,384, filed May 19, 2008, now U.S. Pat. No. 7,985,314, issued Jul. 26, 2011.
U.S. Appl. No. 12/425,187, filed Apr. 16, 2009, (U.S. Pub. No. 2009-0258722 A1), abandoned.
U.S. Appl. No. 12/426,896, filed Apr. 20, 2009, (U.S. Pub. No. 2009-0258721 A1), abandoned.
U.S. Appl. No. 12/511,033, filed Jul. 28, 2009, now U.S. Pat. No. 8,435,133, issued May 7, 2013.
U.S. Appl. No. 12/753,669, filed Apr. 2, 2010, now U.S. Pat. No. 8,518,505, issued 8/27/13.
U.S. Appl. No. 12/753,773, filed Apr. 2, 2010, now U.S. Pat. No. 8,424,236, issued Apr. 23, 2013.
U.S. Appl. No. 12/753,799, filed Apr. 2, 2010, (U.S. Pub. 2010-0273568 A1), abandoned.
U.S. Appl. No. 12/753,804, filed Apr. 2, 2010, (U.S. Pub. 2010-0269626 A1), pending.
U.S. Appl. No. 12/767,736, filed Apr. 26, 2010, now U.S. Pat. No. 8,360,898, issued Jan. 29, 2013.
U.S. Appl. No. 12/848,052, filed Jul. 30, 2010, now U.S. Pat. No. 8,201,357, issued Jun. 19, 2012.
U.S. Appl. No. 12/862,673, filed Aug. 24, 2010, now U.S. Pat. No. 8,480,510, issued Jul. 9, 2013.
U.S. Appl. No. 12/948,637, filed Nov. 17, 2010, (U.S. Pub. 2011-0113673 A1), pending.
U.S. Appl. No. 12/960,261, filed Dec. 3, 2010, now U.S. Pat. No. 8,123,627, issued Feb. 28, 2012.
U.S. Appl. No. 13/208,297, filed Aug. 11, 2011, now U.S. Pat. No. 8,617,664, issued Dec. 31, 2013.
U.S. Appl. No. 13/403,764, filed Feb. 23, 2012, now U.S. Pat. No. 8,845,448, issued Sep. 30, 2014.
U.S. Appl. No. 13/526,323, filed Jun. 18, 2012, now U.S. Pat. No. 8,499,487, issued Aug. 6, 2013.
U.S. Appl. No. 13/750,853, filed Jan. 25, 2013, now U.S. Pat. No. 9,114,295, issued Aug. 25, 2015.
U.S. Appl. No. 13/866,911, filed Apr. 19, 2013, now U.S. Pat. No. 8,966,809, issued Mar. 3, 2015.
U.S. Appl. No. 13/874,889, filed May 1, 2013, now U.S. Pat. No. 9,144,716, issued Sep. 29, 2015.
U.S. Appl. No. 13/916,519, filed Jun. 12, 2013, (U.S. Pub. 2014/0366327), abandoned.
U.S. Appl. No. 13/931,647, filed Jun. 28, 2013, now U.S. Pat. No. 8,734,267, issued May 27, 2014.
U.S. Appl. No. 13/958,211, filed Aug. 2, 2013, pending.
U.S. Appl. No. 14/137,735, filed Dec. 20, 2013, now U.S. Pat. No. 8,617,664, issued Dec. 31, 2013, Huang.
U.S. Appl. No. 14/285,390, filed May 22, 2014, now U.S. Pat. No. 9,375,833, issued Jun. 28, 2016, Huang.
U.S. Appl. No. 14/497,797, filed Sep. 26, 2014, Huang, abandoned.
U.S. Appl. No. 14/671,745, filed Mar. 27, 2015, Huang, (U.S. Pub. 2015-0273647, published Oct. 1, 2015), pending.
U.S. Appl. No. 14/726,093, filed May 29, 2015, now U.S. Pat. No. 9,440,128, issued Sep. 13, 2016, Huang.
U.S. Appl. No. 14/809,072, filed Jul. 24, 2015, Huang, abandoned.
U.S. Appl. No. 15/188,388, filed Jun. 21, 2016, Huang, pending.
U.S. Appl. No. 15/191,125, filed Jun. 23, 2016, Huang, (U.S. Pub. 2017/0013816), pending.
U.S. Appl. No. 15/191,453, filed Jun. 23, 2016, Huang, (U.S. Pub. 2017/0112113), pending.
U.S. Appl. No. 15/261,758, filed Sep. 9, 2016, Huang, (U.S. Pub. 2017/0216691), pending.
U.S. Appl. No. 29/416,672, filed Mar. 26, 2012, now U.S. D679,352, issued Apr. 2, 2013.
U.S. Appl. No. 29/436,610, filed Nov. 7, 2012, now U.S. D696,368, issued Dec. 24, 2013.

\* cited by examiner

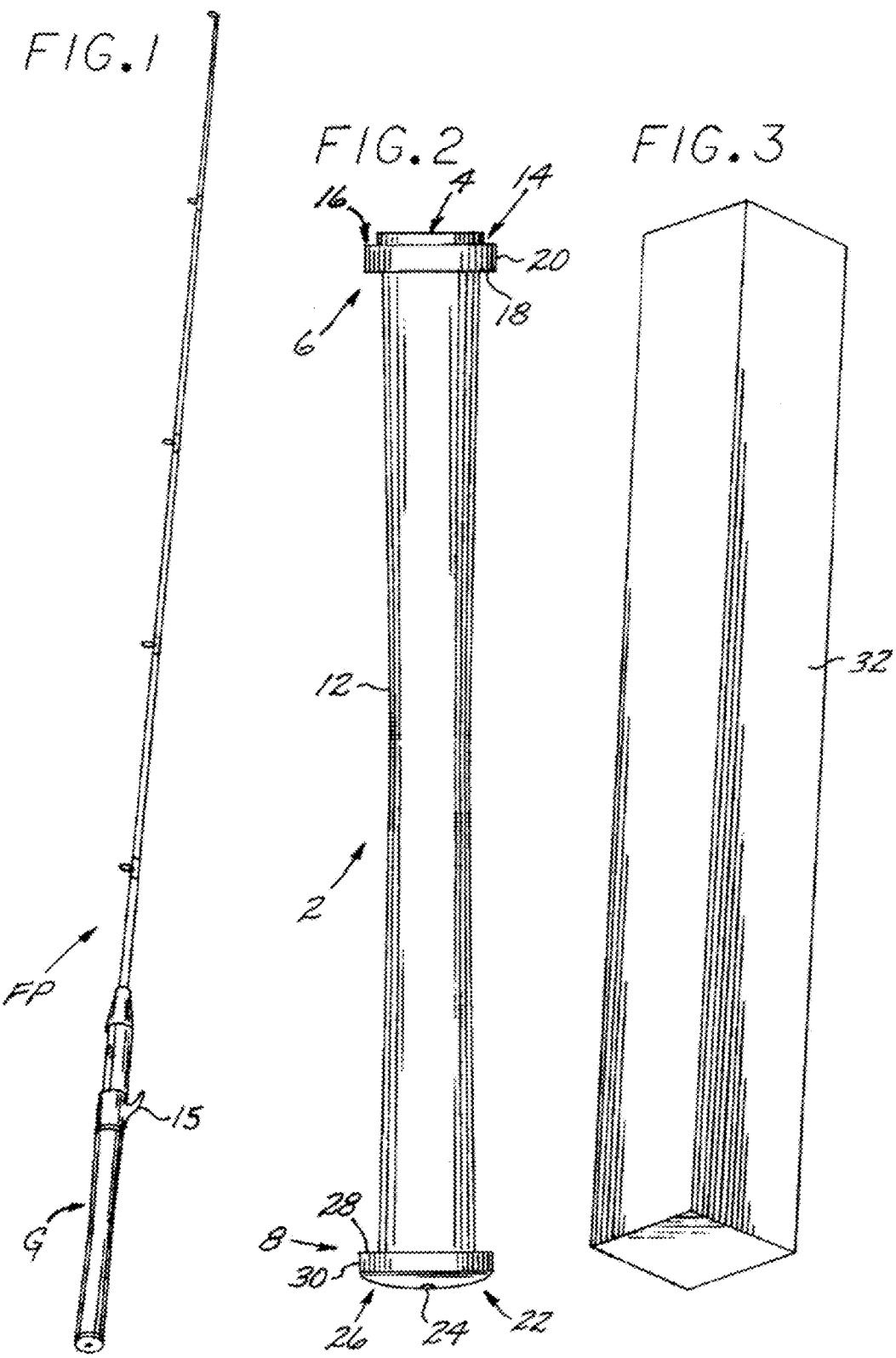

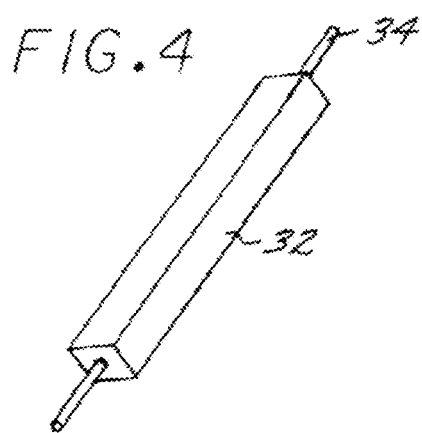
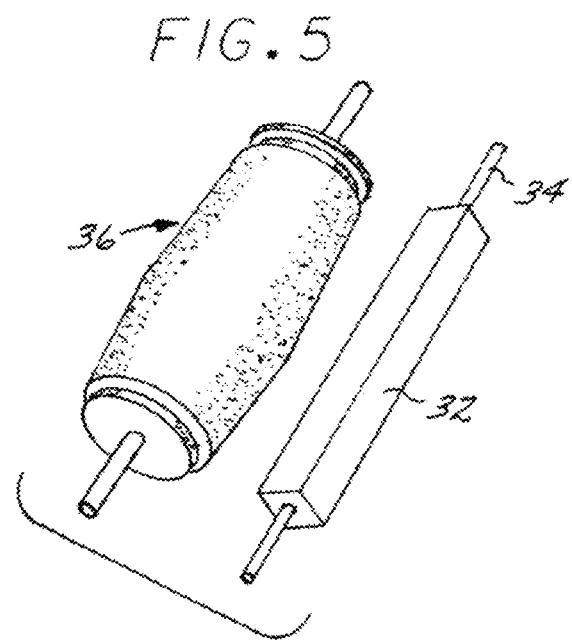
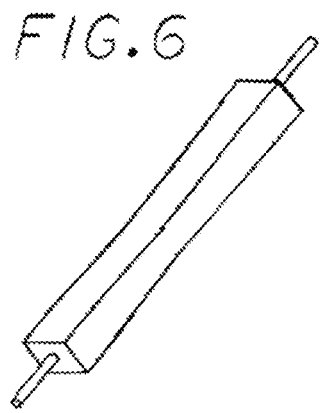
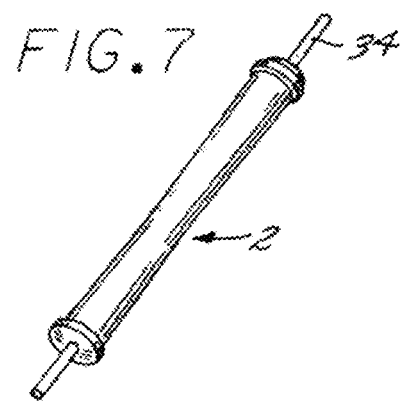
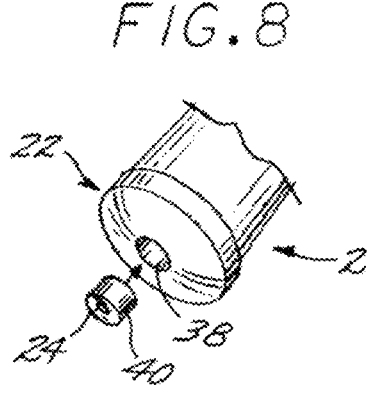
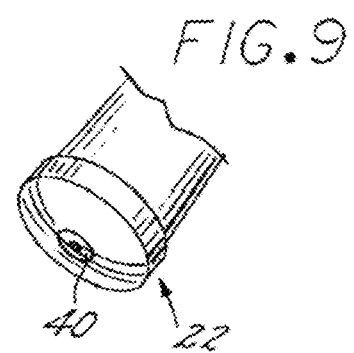

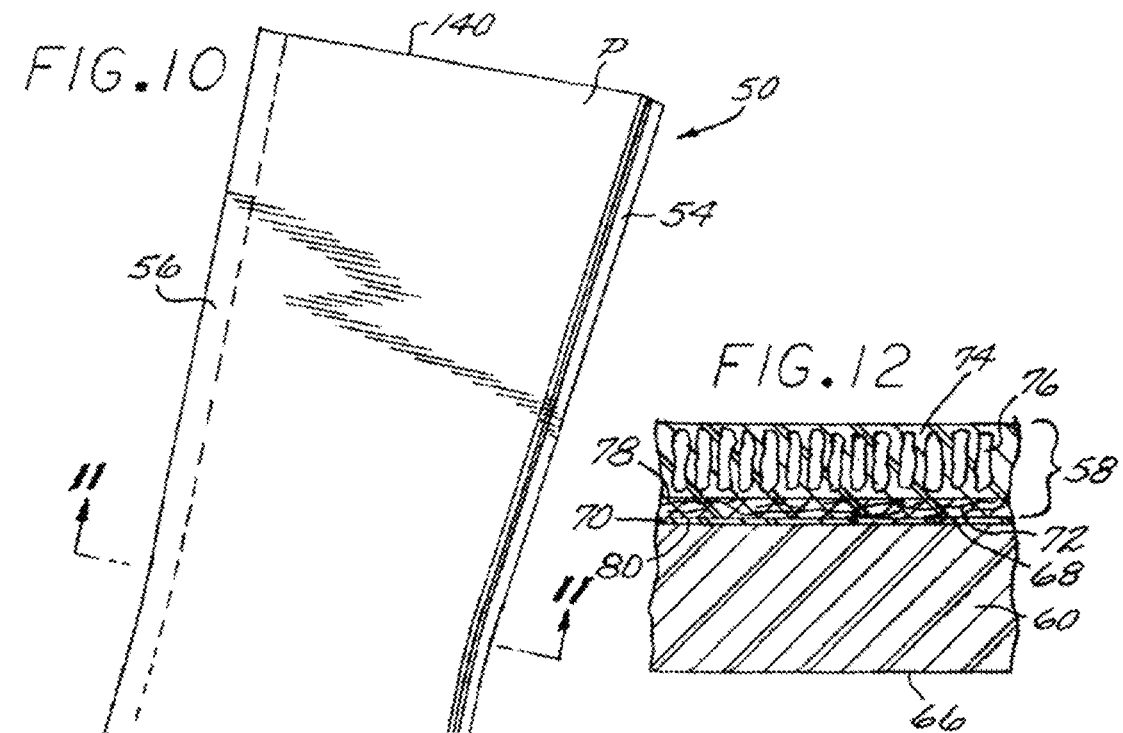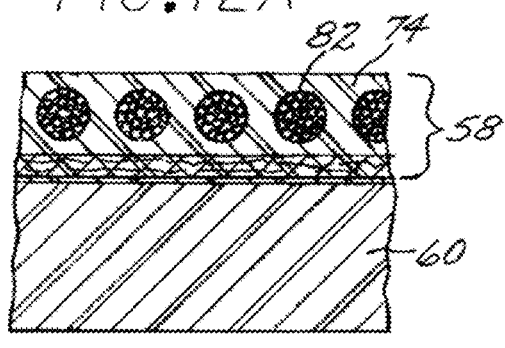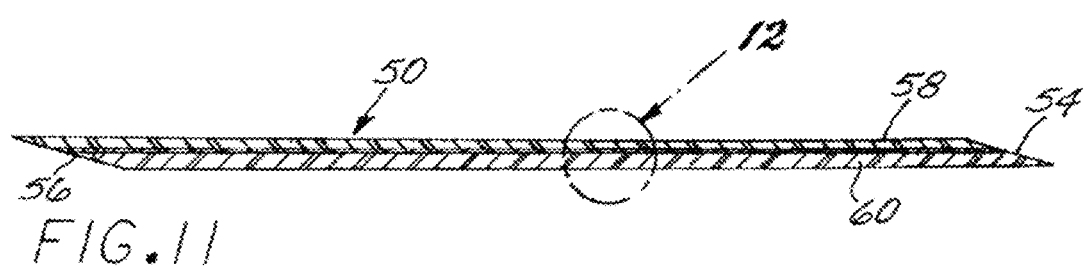

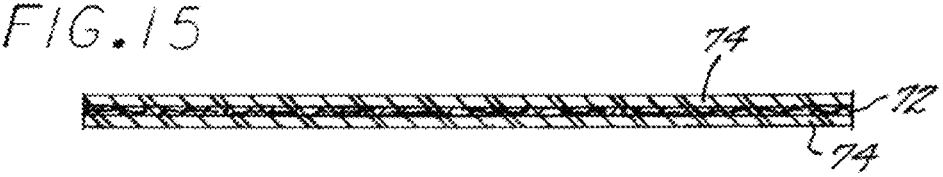
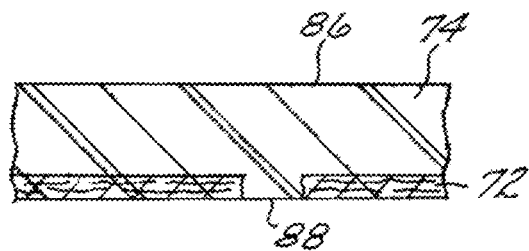
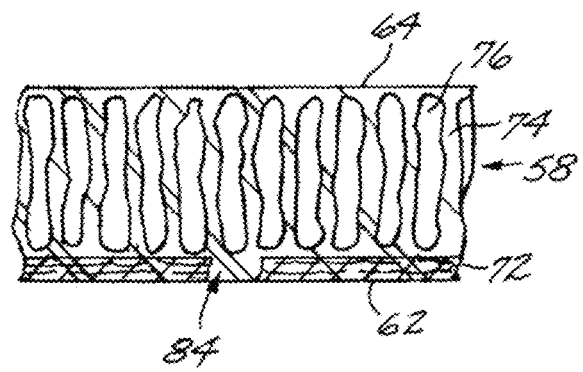

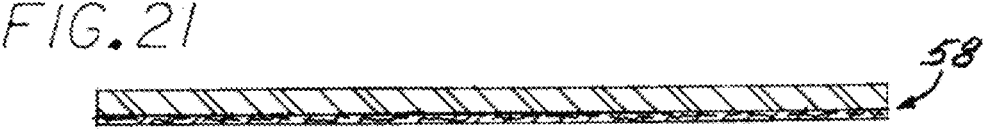
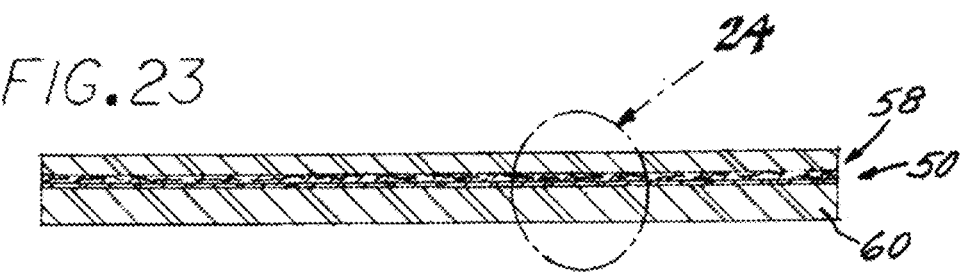
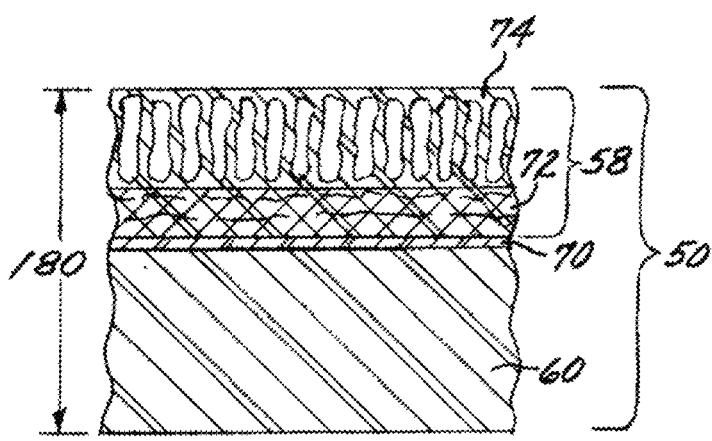

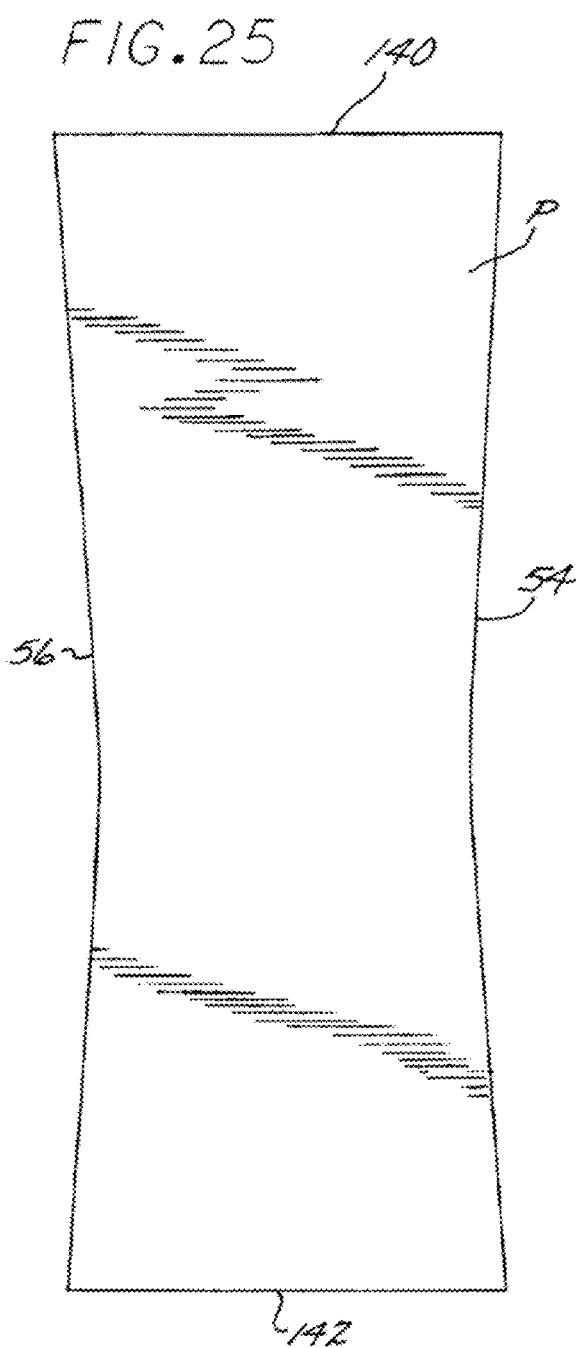

FIG.29
FIG.30
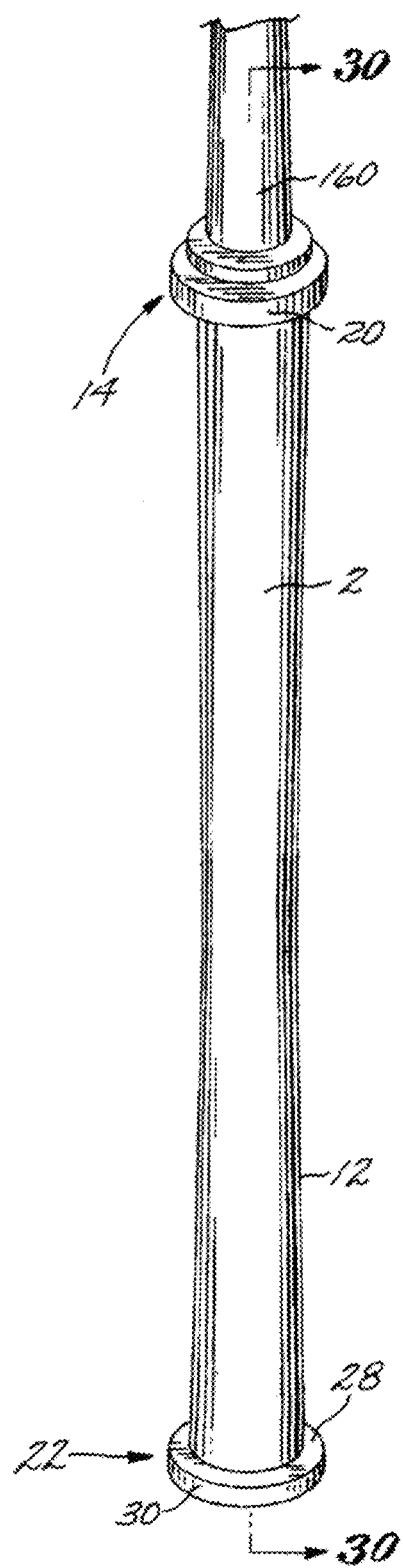
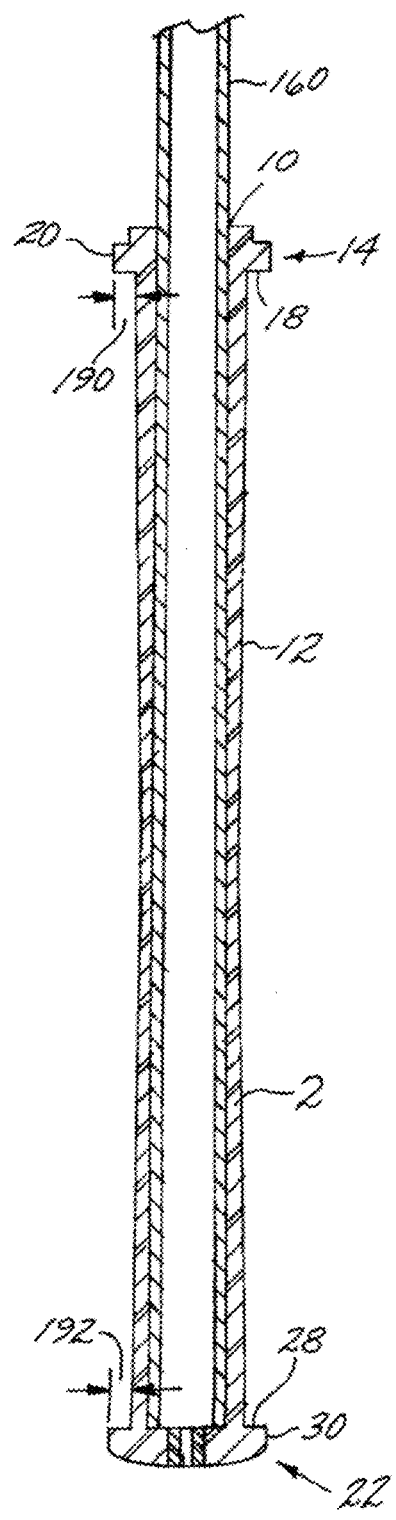

FIG. 31
FIG. 32
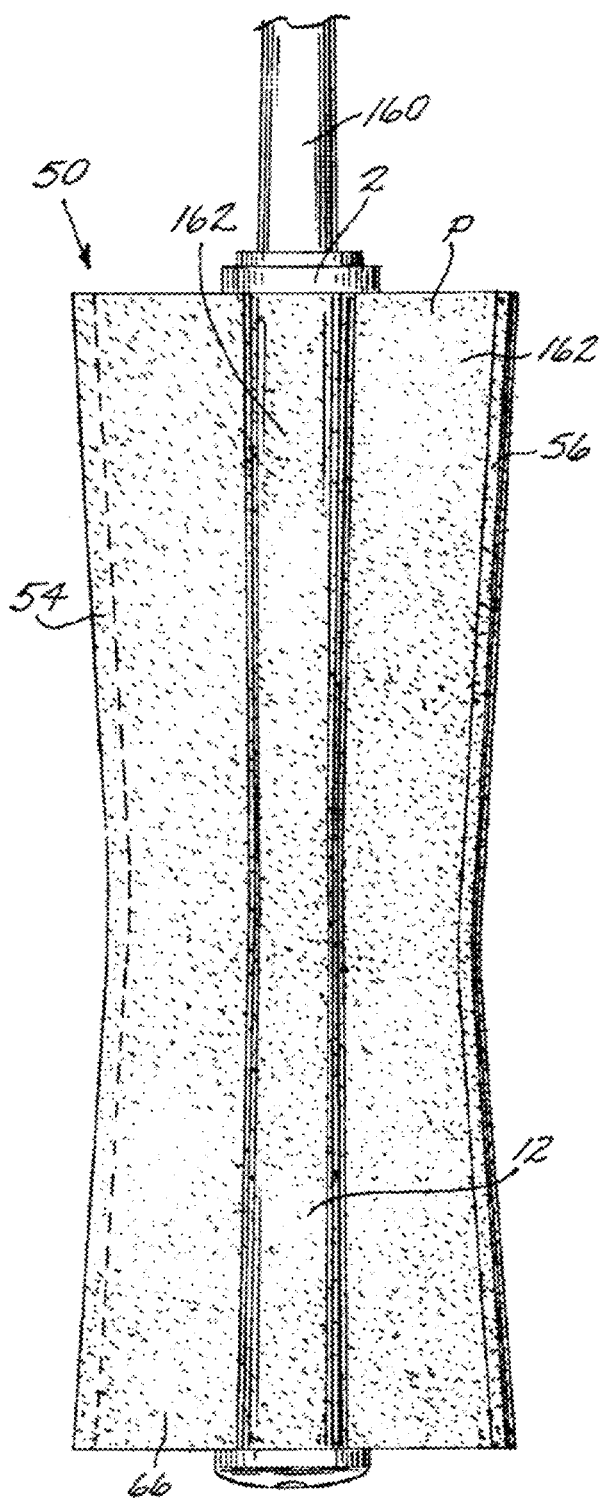
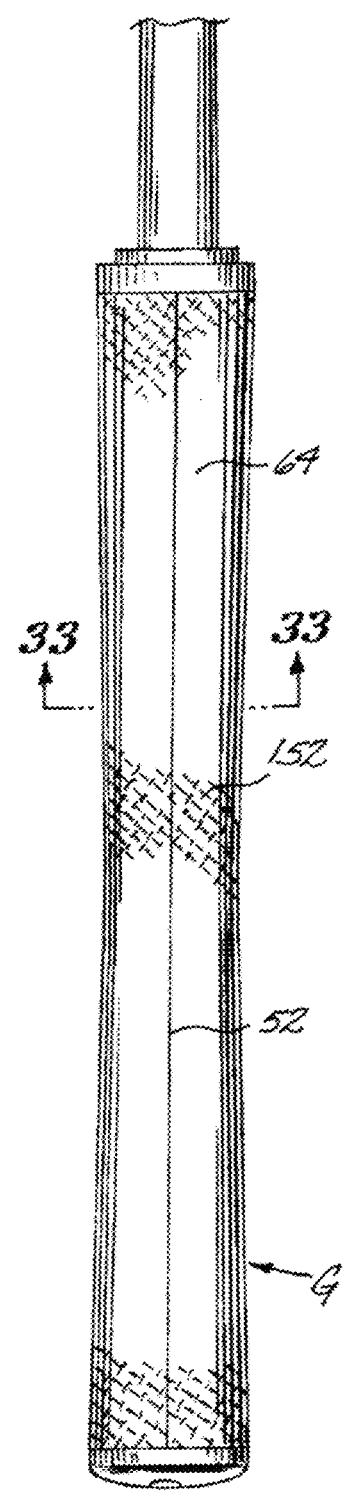

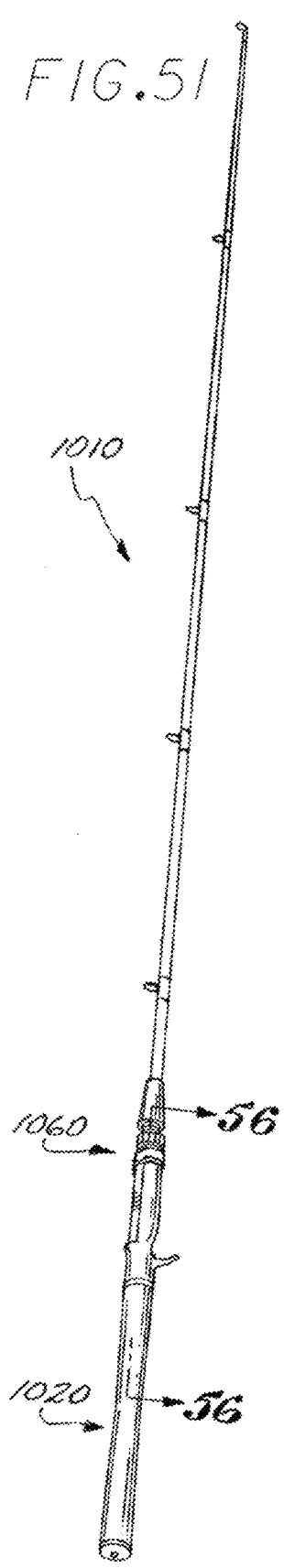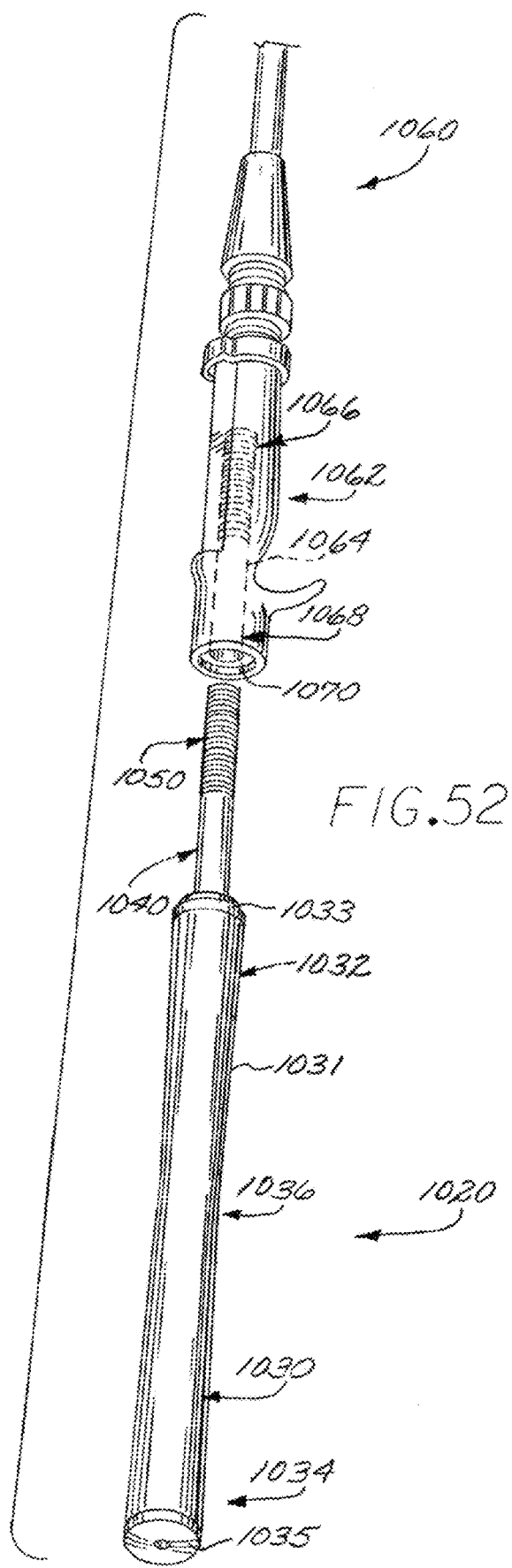

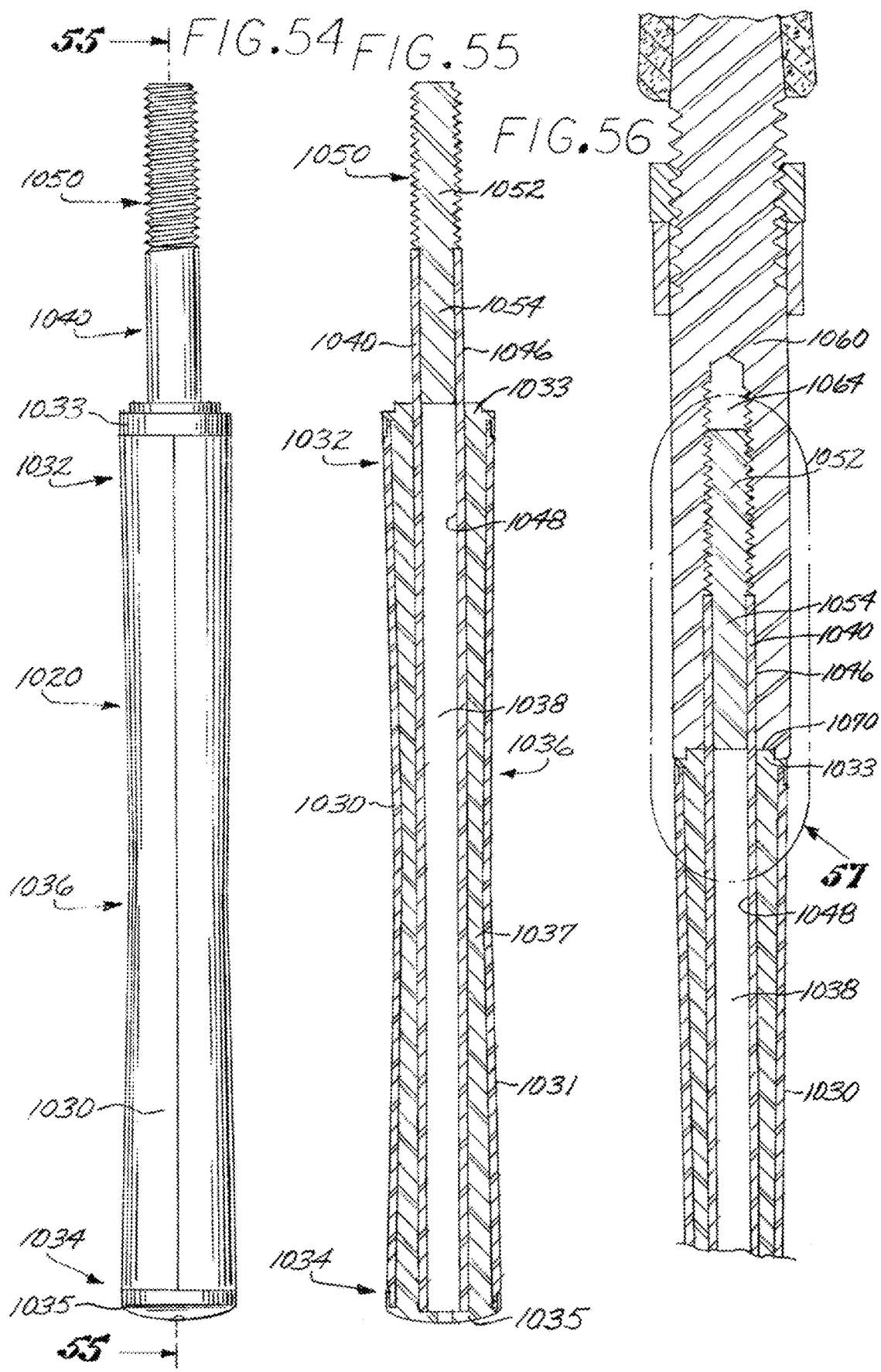

MULTI-LAYERED GRIP

PRIORITY CLAIM

This application is a continuation of U.S. patent application Ser. No. 13/972,751, filed Aug. 21, 2013 (entitled "MULTI-LAYERED GRIP"), which is a continuation-in-part of U.S. patent application Ser. No. 12/753,669, filed Apr. 2, 2010 (entitled MULTI-LAYERED GRIP), which claims the benefit of U.S. Provisional Patent Application No. 61/168,546, filed Apr. 10, 2009 (entitled "MULTI-LAYERED GRIP") and U.S. Provisional Patent Application No. 61/183,488, filed Jun. 2, 2009 (entitled "MULTI-LAYERED GRIP"), the disclosures of each being hereby incorporated by reference in their entireties.

U.S. patent application Ser. No. 13/972,751 is also a continuation-in-part of U.S. patent application Ser. No. 12/948,637, filed Nov. 17, 2010 (entitled EXCHANGEABLE HANDLE FOR USE WITH A FISHING POLE), which claims the benefit of U.S. Provisional Patent Application No. 61/262,511, filed Nov. 18, 2009 (entitled "EXCHANGEABLE HANDLE FOR USE WITH A FISHING POLE"), the disclosures of each being hereby incorporated by reference in its entirety.

The present application also hereby incorporates by reference in their entireties the following U.S. patents: U.S. Pat. Nos. 7,770,321, and 8,424,236, which disclose embodiments of grips for use with fishing poles, the entirety of each being incorporated herein.

BACKGROUND OF THE INVENTION

Field of the Invention

Embodiments of the invention relate to an improved grip for use with the handle portion of articles, in particular, the handle portion of fishing poles and golf clubs. Embodiments of the invention also relate to articles having an exchangeable handle, particularly in the context of fishing poles.

Description of the Related Art

Though grips have been developed, there remains a need for an improved grip. In addition, though handles have been developed there remains a need for an efficient way to exchange handles particularly handles having a gripping portion.

SUMMARY OF THE INVENTION

Some embodiments provide a grip that is light in weight and reduces or eliminates the absorption of water. Some embodiments provide a feeling of tackiness while also minimizing the weight/density of the grip. Embodiments can be configured for use with at least a portion of the handle portion of a variety of articles including fishing poles and golf clubs. Some embodiments include an ethylene-vinyl-acetate (EVA) base or underlisting and a gripping portion including an EVA inner or backing layer. In some embodiments, the gripping portion can include a combination polyurethane and thin fabric layer that is joined to the EVA inner layer. The fabric layer can be impregnated with polyurethane. In some embodiments, the polyurethane further includes a woven fabric mesh layer disposed outside the impregnated fabric layer.

Some embodiments provide a method of manufacturing a grip use with at least a portion of the handle portion of a variety of articles including fishing poles and golf clubs. In some embodiments, the method includes grinding an underlisting sleeve from a block of foam EVA. In some embodiments, the method includes injection molding an EVA underlisting sleeve. In some embodiments, the method further includes dipping a thin fabric substrate into a bath of polyurethane so as to coat both sides of the fabric substrate with polyurethane and to allow polyurethane to soak into and permeate through the fabric substrate, removing a substantial portion of the polyurethane from one side of the fabric substrate and smoothing the outer surface of the polyurethane on the other side of the fabric substrate. The method may further include dipping the polyurethane soaked fabric substrate into a water bath to facilitate the coagulation of the polyurethane in and around the fabric substrate. The coagulated combination substrate of polyurethane and thin fabric can be squeezed, by for example, by a pair of rollers, to squeeze fluid from the coagulated polyurethane pores.

Some embodiments provide a grip configured for use with a handle portion of an article, wherein the grip includes a sleeve member and a gripping member. In some embodiments, the sleeve member comprises ethylene vinyl acetate, includes a hollow cavity configured to receive at least a portion of a handle portion of an article, and defines a first end, a second end and a mounting surface. In some embodiments, the gripping member is joined to the sleeve member and comprises an inner layer comprising ethylene vinyl acetate and an outer layer comprising a first fabric and polyurethane wherein the first fabric is thin relative to the polyurethane to facilitate penetration of the polyurethane through the fabric from an outer surface of the fabric to an inner surface of the fabric. In some embodiments, the polyurethane and first fabric cooperate to define an inner surface for the outer layer, the inner surface of the outer layer being joined to an outer surface of the inner layer of the gripping member, wherein the inner layer of the gripping member is joined to the mounting surface of the sleeve member such that the ethylene vinyl acetate sleeve member is joined to the ethylene vinyl acetate gripping member.

Some embodiments provide a method of making a grip for use with the handle portion of an article comprising the steps of providing a sleeve member comprising a hollow cavity configured to receive at least a portion of a handle portion of an article, the sleeve member comprising ethylene vinyl acetate and defining a first end, a second end and a mounting surface. In some embodiments, the method further includes dipping a first fabric sheet comprising an inner surface and an outer surface into liquid polyurethane such that polyurethane coats both the inner surface and the outer surface and penetrates through the first fabric sheet between the inner and outer surfaces and joining the dipped sheet to the mounting surface of the sleeve member.

Some embodiments provide a gripping material configured for use with the handle portion of an article, the gripping material an inner layer comprising ethylene vinyl acetate and an outer layer. In some embodiments, the outer layer includes an inner surface and an outer surface and comprises a thin fabric member having an inner surface and an outer surface defining a substantially uniform fabric thickness therebetween. In some embodiments, the fabric member is substantially impregnated by polyurethane such that the polyurethane penetrates through the fabric member to form, in combination with at least a portion of the fabric member, the inner surface of the outer layer. In some embodiments, the polyurethane in the outer layer defines at least a portion of the outer surface of the outer layer and defines a polyurethane thickness extending from the outer surface of the fabric member to the outer surface of the outer layer, wherein the polyurethane thickness and the fabric thickness defining a thickness ratio of approximately 1. In some embodiment, the outer layer is adhered to the inner layer.

Embodiments of the present invention include one or more advantages including offering great feel by transmitting sensitive vibrations to the hand of a user and being light in weight and of low density. In the context of fishing pole grips, the low density and extremely light weight allows the grip to float in water regardless of how wet it becomes. In the context of golf club grips, lighter grips allow for the manipulation of the club swing weight. Current common grips weigh approximately 52 grams. Embodiments of the present invention can reduce the weight of the grip by approximately 32 grams. Generally, decreasing the weight of a grip by approximately 4.5 grams will increase one unit of the club's swing weight. Thus, a 32 gram savings in grip weight can increase a club's swing weight by approximately 7 units. Increased swing weight allows a golfer to hit the ball further with a similar stroke. Further, decreasing the weight of a grip will decrease the total weight of a club, feature that can be beneficial to older and female golfers. Furthermore, light weight grips are important for longer shafted clubs which may be preferred by longer distance and taller golfers. In addition, a golfer generally carries approximately 14 clubs in their bag. When that golfer is walking the course or carrying the bag any appreciable distance, it is advantageous to reduce the weight of the bag as much as possible. This can be accomplished by using embodiments of the present grip that are much lighter than standard grips.

An aspect of at least one of the embodiments disclosed herein includes the realization that the handles on articles can require exchange or replacement. Sometimes, the handles can have gripping portions that can become damaged or worn, often due to repeated use. In the context of fishing pole grips, the wet environments and the exposure to outdoor conditions can expedite the deterioration of the handle and grips.

Thus, in accordance with at least one of the embodiments disclosed herein, a handle can be configured for use with at least a portion of a fishing pole. The handle can comprise a grip portion comprising a cavity open to at least one end, the cavity extending longitudinally at least partially through the grip portion. A shaft can have a first end and a second end with the first end of the shaft at least partially inserted into an open end of the grip portion. Coupled to the second end of the shaft can be an adapter comprising a first coupling member. The adapter can be configured to be releasably attached to a second coupling member on a rod portion.

Some embodiments can include a handle comprising a grip portion, a shaft extending from the grip portion, and a first coupling member disposed on at least a portion of the shaft. The first coupling member can be configured to be releasably attached to a complimentary second coupling member disposed on an article.

In a method of using a fishing pole with an exchangeable handle, the method can comprise the steps of unbinding the exchangeable handle from the fishing pole and removing the exchangeable handle from the fishing pole. Once the exchangeable handle is removed, another exchangeable handle can be introduced to the fishing pole and bound to the fishing pole.

Embodiments can provide the ability to customize an article for different situations by easily exchanging a handle of the article. In the context of fishing pole, the handle can be exchanged for a handle with a gripping portion that is better suitable for a specific situation, such as to accommodate for different weather conditions, size and type of fish, or user's preferences.

BRIEF DESCRIPTION OF THE DRAWINGS

Further objects, features and advantages of the inventions will become apparent from the following detailed description taken in conjunction with the accompanying figures showing illustrative embodiments of the invention, in which:

FIG. 1 is a perspective view of an exemplary fishing pole incorporating a grip according to some embodiments;

FIG. 2 is a front view of a grip component according to some embodiments;

FIG. 3 is a perspective view of a block of material for use in making the component shown in FIG. 2 according to some embodiments;

FIG. 4 is a perspective view of the block shown in FIG. 3 on a mount for use during the manufacturing process of a grip component according to some embodiments;

FIG. 5 is a perspective view of the mounted block shown in FIG. 4 with a grinding wheel for use during the manufacturing process of a grip component according to some embodiments;

FIG. 6 is a perspective view of a partially shaped grip component according to some embodiments;

FIG. 7 is a perspective view of a shaped grip component according to some embodiments;

FIG. 8 is a perspective view of an end of the grip component shown in FIG. 7 after the mount is removed and before an end filler is applied according to some embodiments;

FIG. 9 is a perspective view of the end shown in FIG. 8 after the end filler is applied according to some embodiments;

FIG. 10 is a perspective view of a gripping member configured for use with the grip component shown in FIG. 2 according to some embodiments;

FIG. 11 is a section view of the gripping member shown in FIG. 10 taken along the line 11-11 in FIG. 10;

FIG. 12 is an enlarged view of a portion of the gripping member designated by the circle 12 in FIG. 11;

FIG. 12A is an alternative view of the portion shown in FIG. 12 according to some embodiments;

FIG. 15 is a section view of a component of the gripping member shown in FIG. 10 taken along the line 15-15 in FIG. 13;

FIG. 16 is a section view of a component of the gripping member shown in FIG. 10 taken along the line 16-16 in FIG. 13;

FIG. 17 is a section view of a component of the gripping member shown in FIG. 10 taken along the line 17-17 in FIG. 13;

FIG. 18 is an enlarged view of a portion of the component shown in FIG. 16 designated by the circle 18 in FIG. 16 according to some embodiments;

FIG. 19 is an enlarged view of a portion of the component shown in FIG. 17 designated by the circle 19 in FIG. 17 according to some embodiments;

FIG. 21 is a section view of a component of the gripping member shown in FIG. 10 taken along the line 21-21 in FIG. 20;

FIG. 22 is a section view of a component of the gripping member shown in FIG. 10 taken along the line 22-22 in FIG. 20;

FIG. 23 is a section view of a component of the gripping member shown in FIG. 10 taken along the line 23-23 in FIG. 20;

FIG. 24 is an enlarged view of a portion of the component shown in FIG. 23 designated by the circle 24 in FIG. 23 according to some embodiments;

FIG. 25 is a top view of the gripping member shown in FIG. 10 according to some embodiments;

FIG. 29 is a perspective view of the grip component shown in FIG. 3 on a mandrel for use in the manufacturing of a grip according to some embodiments;

FIG. 30 is a section view of the mandrel mounted grip component shown in FIG. 29 taken along the line 30-30 in FIG. 29;

FIG. 31 is a front view of a grip component and a gripping member during the manufacturing process according to some embodiments;

FIG. 32 is a completed grip according to some embodiments;

FIG. 51 is a perspective view of a fishing pole with a handle according to some embodiments.

FIG. 52 is an exploded perspective view of a fishing pole in FIG. 51 showing a configuration for coupling a handle with a rod portion, according to some embodiments.

FIG. 54 is a side plan view of an assembled handle of a fishing pole in FIG. 53 according to some embodiments.

FIG. 55 is a cross-sectional plan view of the assembled handle shown in FIG. 54 taken along line 55-55.

FIG. 56 is a cross-sectional plan view of the fishing pole with a handle shown in FIG. 51 taken along line 56-56.

Figure 13:
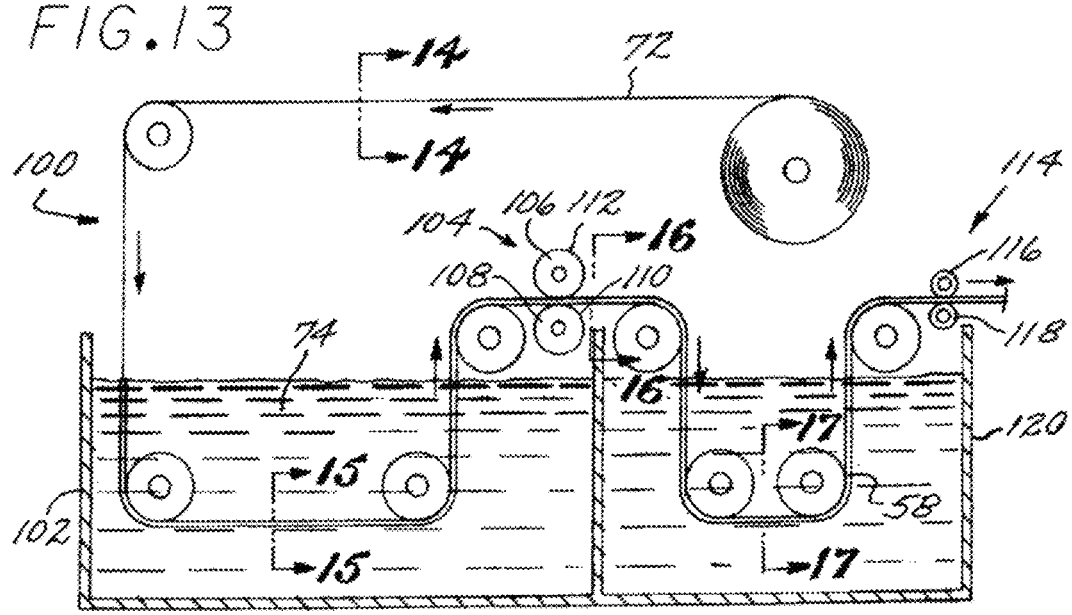
FIG. 13 is a schematic view of an apparatus for use in the manufacturing of the gripping member shown in FIG. 10 according to some embodiments.

While the invention will now be described in detail with reference to the figures, it is done so in connection with the illustrative embodiments. It is intended that changes and modifications can be made to the described embodiments without departing from the true scope and spirit of the invention.

DETAILED DESCRIPTION OF THE PREFERRED EMBODIMENTS

FIG. 1 is a perspective view of a fishing pole FP incorporating a grip G according to some embodiments.

FIG. 2 is a front view of an underlisting sleeve member 2 or sleeve according to some embodiments. The sleeve 2 includes a cavity 4 configured to receive at least a portion of the handle portion of a fishing pole or other article. In some embodiments, the sleeve 2 further includes a first end 6 with an opening 10 (FIG. 30) adapted to receive the handle portion and a second end 8 including a substantially enclosed closed end. A mounting surface 12 or body extends between the first and second ends 6, 8.

In some embodiments, the first end 6 may include a nipple 14, which in some embodiments is a stepped structure configured to accommodate a finger hook 15 of a fishing rod FP. Alternatively, in some embodiments the nipple 14 may be tapered to provide a smoother transition from the smaller diameter exposed handle, rod, or shaft near the nipple to the main gripping portion of the grip G. The nipple 14 may be integrally formed with the mounting surface 12 or may be separately formed and later joined to the mounting surface 12. In some embodiments, the nipple 14 may define a circumferential nipple ledge 16 extending around the sleeve member 2 and extending radially outward from the mounting surface 12 of the sleeve member 2 adjacent the mounting surface 12. The nipple ledge 16 may comprise a nipple contact surface 18 and a nipple outer surface 20.

In some embodiments, the second end 8 may include a cap structure 22. The cap 22 may include an opening 24 to facilitate the escape of air as a handle is inserted into the sleeve 2 or to facilitate the escape of moisture from the handle or other part of the fishing pole. The cap 22 may define a generally convex shape on its end. In some embodiments, the cap 22 defines a circumferential cap ledge 26 extending around the sleeve member 2 and extending radially outward from the mounting surface 12 of the sleeve member 2 adjacent the mounting surface 12. The cap ledge 26 comprises a cap contact surface 28 and a cap outer surface 30.

FIGS. 3-9 illustrate a method of manufacturing a sleeve 2 according to some embodiments. In some embodiments, a block 32 of ethylene-vinyl-acetate (EVA) (FIG. 3) is mounted on a support rod 34 (FIG. 4) to facilitate a grinding process. As shown in FIG. 5, a grinder 36 shaped to impart a desired configuration is brought into contact with the block 32 of EVA. As the block 32 makes contact with the grinder 36, the general shape of the grip component is formed. The same grinder that forms the mounting surface 12 or body of the sleeve 2 may also shape the nipple 14 and/or cap 22 if so included. Alternatively, these portions of the grip G are formed by one or more additional grinders of appropriate shape.

In some embodiments, once the shape of the sleeve 2 is completed (FIG. 7), the mounting rod 34 is preferably removed. In some embodiments, the mounting rod 34 has an external diameter generally equal to the external diameter of the handle portion of an article intended to be inserted into the sleeve 2. The hole 38 left at the second end 8 can be filled with an appropriately shaped plug 40. In some embodiments, the plug 40 is made from the same material as the sleeve 2 so as to seamlessly or virtually seamlessly blend in with the sleeve 2. Alternatively, the plug 40 may be a different material to facilitate the placement of aesthetically pleasing designs, or contrasting colors or textures at the second end 8 of the sleeve 2. Preferably, in some embodiments, the plug 40 includes a small hole 24 or opening to permit the release of air or fluid as described above.

FIGS. 10-12A illustrate a gripping member 50 according to some embodiments. The gripping member 50 is shaped to generally correspond with the mounting surface 12 of the sleeve 2 when applied thereto. Shown as a panel P, the illustrated embodiment is folded or wrapped around the mounting surface 12 to form a substantially vertical seam 52 (FIG. 32) that joins the side edges 54, 56 of the panel 50 as described in greater detail below. Alternatively, the gripping member 50 could be formed as a strip that would in turn be spirally wrapped around the mounting surface 12. In some embodiments, multiple panels and/or strips may be incorporated.

FIG. 11 is a section view of the gripping member 50 taken along the line 11-11 in FIG. 10. In some embodiments, the gripping member 50 preferably includes an outer layer 58 adhered, bonded, glued or otherwise attached to a base or inner layer 60. The outer layer 58 defines an inner surface 62 and an outer surface 64 (FIG. 19). Similarly, the inner layer 60 defines an inner surface 66 and an outer surface 68. In some embodiments, a spray on adhesive 70 is applied to one or both of the inner surface 62 of the outer layer 58 and/or the outer surface 68 of the inner layer 60. In some embodiments, the inner layer 60 comprises EVA to reduce the weight and lower the density of the finished grip G and to provide a cushioning material that is less inclined to absorb and hold water or other fluids. This is particularly useful in fishing pole applications, for example when the pole is dropped into the water, as the lightweight/low density grip according to embodiments of the present invention will preferably float even when wet. In some embodiments, the EVA inner layer 60 is between approximately 0.5 and 1.5 millimeters thick. In some embodiments, the EVA inner layer 60 is between approximately 0.75 and 1.25 millimeters thick. In a preferred embodiment, the EVA inner layer 60 is approximately 1 millimeter thick.

FIG. 12 is an enlarged view of a portion of the gripping member 50 designated by the circle 12 in FIG. 11. As described in greater detail below, the outer layer 58 preferably includes a thin non-woven fabric layer 72 that is saturated with polyurethane 74, by, for example, dipping the thin fabric layer 72 into a polyurethane bath 102. The polyurethane 74 is preferably coagulated to form one or more closed cells or pores 76. The non-woven fabric layer 72 has an outer surface 78 and an inner surface 80 and may be fabricated of suitable materials such as nylon, cotton, polyester, or the like and may be felt. The fabric layer 72 is preferably compressed reduce its thickness prior to the application of polyurethane 74 thereto. In some embodiments, the compression also enhances the rigidity of the fabric layer 72. In some embodiments the compression also spreads the non-woven fibers to enhance the penetration of the polyurethane 74 into the thin fabric layer 72. Increasing the amount of polyurethane penetration and saturation into the thin fabric layer reduces the amount of space available for water and other fluids to soak into and become trapped within the gripping member. This is particularly useful in fishing pole applications. In some embodiments, the thin non-woven fabric layer is between approximately 0.1 and 0.5 millimeters. In some embodiments, the thin non-woven fabric layer 72 is between approximately 0.3 and 0.4 millimeters thick. In some embodiments, the thin non-woven fabric layer 72 is between approximately 0.3 and 0.35 millimeters thick. In a preferred embodiment, the thin fabric layer 72 is approximately 0.35 millimeters thick.

In some embodiments, the thin fabric layer 72 is coated with and saturated by polyurethane 74. In some embodiments, the polyurethane 74 coating the thin fabric layer 72 is between approximately 0.1 and 0.4 millimeters thick measured from the outer surface 78 of the fabric layer 72. In some embodiments, the polyurethane 74 coating the thin fabric layer 72 is between approximately 0.15 and 0.25 millimeters thick. In a preferred embodiment, the polyurethane 74 coating the thin fabric layer 72 is approximately 0.2 millimeters thick.

Embodiments of the present invention provide a lightweight/low density grip with sufficient torsion resistance for use with a variety of articles including fishing rods and golf clubs. In some embodiments, a finished gripping member 50 including a combined polyurethane/thin fabric layer 58 adhered to an EVA base layer 60 weighs between approximately 5.0 and 6.0 grams. In a preferred embodiment, the gripping member 50 weighs approximately 5.3 grams while still providing the sensitive vibration feel and structural benefits to be able to float on water even when wet.

FIG. 12A is an alternative view of the portion shown in FIG. 12 according to some embodiments. In this embodiment, an additional woven fabric mesh 82 is included in the polyurethane layer 74 during the manufacturing process. In some embodiments, the fabric mesh 82 is attached to the thin non-woven fabric layer 72 prior to dipping in the polyurethane bath 102. For example, the fabric mesh 82 can be stitched to an end of the thin fabric layer 72 and the combination dipped into a polyurethane bath 102. An example of the dipping process is described in greater detail below. The woven fabric mesh 82 generally does not absorb the polyurethane 74 during the preparation process. In some embodiments, the outer layer 58 of the gripping member 50 includes a saturated thin fabric layer 72 and an un-saturated fabric mesh layer 82. In some embodiments, the fabric mesh 82 includes longitudinally extending fibers (fibers that extend generally along the length of the long axis of a grip or along the long axis of a strip is the finished grip is formed from a spirally wrapped strip) and transversely extending fibers. In some embodiments, the longitudinally extending fibers will preferably be of a larger diameter than the transversely extending fibers. For example, the longitudinal fibers may have a diameter between approximately 0.4 and 0.75 millimeters and the transverse fibers may have a diameter between approximately 0.25 and 0.5 millimeters. In some embodiments, the longitudinal and transverse fibers may be of substantially equal diameters. The woven fabric mesh 82 may be fabricated of suitable materials such as nylon, cotton, polyester, or the like.

FIGS. 13-24 illustrate a method of manufacturing a gripping member 50 according to some embodiments. FIG. 13 is a schematic view of an apparatus 100 useful in some embodiments of the manufacturing method. Generally, in some embodiments, a thin non-woven fabric sheet 72 is dipped into a polyurethane bath 102. In some embodiments, the bath 102 is a solution of polyurethane 74 (e.g., polyester, polyether) dissolved in dimethylformamide (DMF). The solids content of the polyurethane 74 will vary in accordance with the desired hardness of such polyurethane 74. A preferred solids content solution is approximately 28.5-30.5%, with a viscosity range of about 60,000-90,000 cps measured at 25.+−0.5 degrees C. The viscosity of the polyurethane bath 102 can be manipulated to control the thickness of the polyurethane 74 that ultimately collects on the fabric sheet 72. The polyurethane 74 preferably coats both sides 78, 80 of the fabric sheet 72 and saturates through the fabric sheet 72.

In some embodiments, not shown, additional liquid polyurethane can be added to the top surface of the uncoagulated polyurethane 74 that coats the thin fabric sheet 72 after the sheet 72 is directed out of the polyurethane bath 102. The second polyurethane can include one or more different characteristics from the polyurethane 74 in the bath 102 to provide contrast on the gripping member 50. For example, the second polyurethane can include a different color, durometer or level of tackiness.

In some embodiments, the fabric/polyurethane sheet is directed out of the polyurethane bath 102 and into a first processing stage 104 in which a portion of the polyurethane 74 is removed from the bottom 80 of the fabric sheet 72. In some embodiments, a majority of the polyurethane 74 is removed. In addition, the top surface 86 of the polyurethane 74 is preferably smoothed. In some embodiments, the processing stage 104 occurs in a compression system comprising a pair of rollers 106, 108. The spacing of the rollers 106, 108 can be used to help determine the thickness of the polyurethane 74 coating the fabric sheet 72. In some embodiments, the bottom roller 108 includes a rubber surface 110 or a surface comprising another similar resilient material. The bottom roller 108 preferably removes a portion of the polyurethane 74 and in some embodiments the majority of the polyurethane 74 from the bottom 80 of the fabric sheet 72. In some embodiments, the bottom roller 108 can be substituted with any other similar apparatus which strips off polyurethane 74 from the bottom of the fabric sheet 72. For example, a non-rotating edge may be used. In some embodiments, the top roller 106 includes a stainless steel surface 112 or a surface comprising another similar smooth, hard surface. The top roller 106 preferably smoothes the top surface 86 of the polyurethane 74 that coats the fabric sheet 72.

When a wet coagulation process is used, the saturated and coated fabric sheet 58 is then preferably directed into one or more water baths 120 to displace the DMF from the polyurethane 74 and to facilitate the formation of pores 76 in the polyurethane 74. From the water bath 120, the coagulated polyurethane sheet 58 is preferably directed to another processing stage 114 to press water and DMF from the coagulated polyurethane sheet 58. In some embodiments, the processing stage 114 includes one or more pairs of rollers 116, 118.

Figure 14:
FIG. 14 is a section view of a component of the gripping member shown in FIG. 10 taken along the line 14-14 in FIG. 13.
Figure 14A:
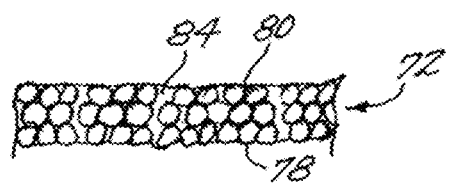
FIG. 14A is an enlarged view of a portion of the component shown in FIG. 14 designated by the circle 14A in FIG. 14 according to some embodiments.
Figure 14B:
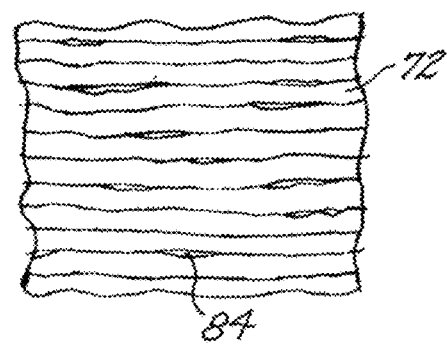
FIG. 14B is a top view of a portion of the component shown in FIG. 14 according to some embodiments.

FIG. 14 is a section view taken along the line 14-14 of the thin non-woven fabric sheet 72 before it is dipped in the polyurethane bath 102 according to some embodiments. FIG. 14A is an enlarged section view of the thin fabric sheet 72. FIG. 14B is an enlarged surface view of the thin fabric sheet 72. As described above, the non-woven sheet 72 is preferably compressed prior to being dipped. The compression process can add rigidity to the sheet 72 and can open or enhance random holes 84 in the sheet 72 as shown in FIG. 14B. These holes 84 facilitate the saturation of polyurethane 74 into and through the fabric sheet 72 during the dipping and coagulation process.

FIG. 15 is a section view taken along the line 15-15 of the thin fabric sheet 72 after it has been dipped into the polyurethane bath 102 according to some embodiments. The polyurethane 74 preferably coats both sides of the fabric sheet 72 and penetrates through the sheet 72.

FIG. 16 is a section view taken along the line 16-16 of the thin fabric sheet 72 after it has been dipped into the polyurethane bath 102 and the polyurethane 74 has been substantially stripped from the bottom side 80 according to some embodiments. FIG. 18 is an enlarged section view of the sheet 72 after the bottom 80 has been substantially stripped of polyurethane 74, and before the polyurethane 74 on top and inside is coagulated. The non-woven fabric 72 generally includes holes 84 that allow portions of the polyurethane 74 to extend from the top surface 86 of the polyurethane 74 coating the fabric 72 to the bottom surface 80 of the saturated sheet of fabric 72.

FIG. 17 is a section view taken along the line 17-17 of the coated and saturated sheet 58 after it has been dipped into the water bath 120 according to some embodiments. FIG. 19 is an enlarged section view of the coated and saturated sheet 58 after the polyurethane 74 is coagulated. The coagulation process generally allows the polyurethane 74 to expand and increase in thickness. In addition, pores 76 preferably form within the polyurethane 74 and enhance can enhance features of the grip G including tackiness of the gripping member 50.

In some embodiments, the polyurethane 74 coating the top or outer surface 78 of the fabric sheet 72 defines an outer surface 86. Similarly, the polyurethane 74 coating the bottom or inner surface 80 of the fabric sheet 72 defines an inner surface 88. The polyurethane 74 defines a first thickness between the outer surface 86 of the polyurethane 74 and the outer surface 78 or plane of the fabric sheet 72. The polyurethane 74 defines a second thickness between the inner surface 88 of the polyurethane 74 and the inner surface 80 of the sheet 72. In some embodiments, the first thickness is substantially greater than the second thickness. In some embodiments, the first thickness is between approximately 2 and 50 times as thick as the second thickness. In some embodiments, the first thickness is between approximately 10 and 15 times as thick as the second thickness. In some embodiments, the second thickness is approximately zero.

Figure 19A:
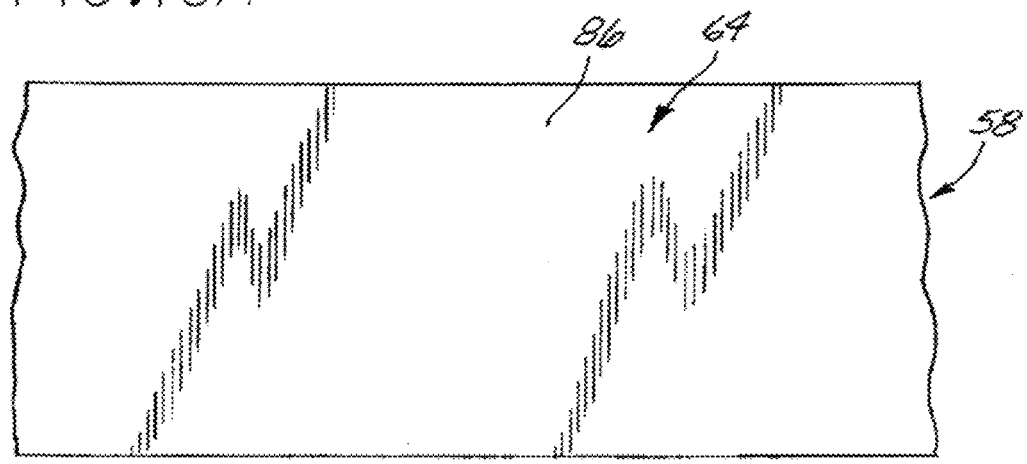
FIG. 19A is a top view of the component shown in FIG. 17.
Figure 19B:
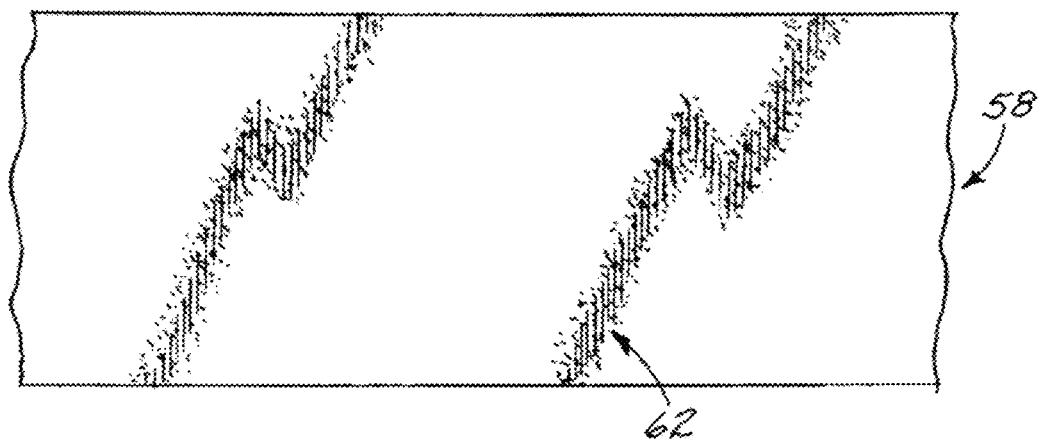
FIG. 19B is a bottom view of the component shown in FIG. 17.

FIGS. 19A and B illustrate top and bottom surface views, respectively, of the coagulated polyurethane/fabric sheet 58. FIG. 19A shows the generally smooth surface 86 of the coagulated polyurethane 74 forming the outer surface 64 of the outer layer 58. This surface 86 can be further manipulated, such as, for example, by using a heated mold or platen to form a friction enhancing pattern thereon or to imprint logos or other indicia. In addition, the surface 86 can include printed materials as known to those of skill in the art. FIG. 19B shows the bottom surface 62 of the coagulated polyurethane/fabric sheet 58. In some embodiments, the bottom surface includes both fabric fibers from the thin non-woven fabric sheet 72 as well as polyurethane 74. The bottom surface 62 is preferably rougher than the smooth top surface 64 which can facilitate bonding, adhering, or otherwise joining the polyurethane/felt sheet 58 to its EVA inner layer 60 as described in greater detail below according to some embodiments. In some embodiments, a portion of polyurethane 74 remains on the bottom or inner surface 80 of the fabric sheet 72 after the treatments described above. In some embodiments, the fabric sheet 72 is discernable through at least a portion of the polyurethane 74 remaining on the inner surface 62.

Figure 20:
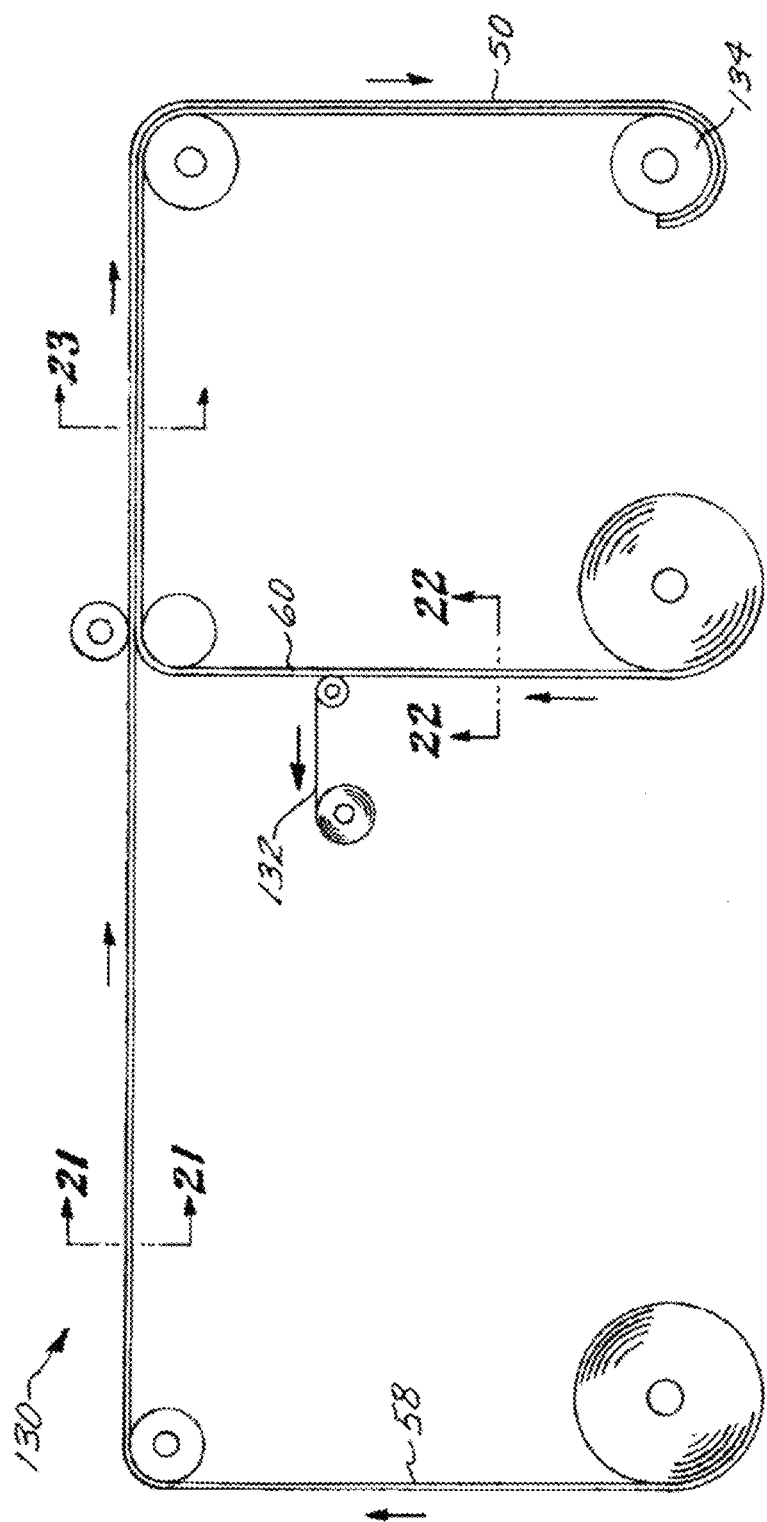
FIG. 20 is a schematic view of an apparatus for use in the manufacturing of the gripping member shown in FIG. 10 according to some embodiments.

FIG. 20 is a schematic view of an apparatus 130 useful in some embodiments of the manufacturing method. The polyurethane/felt sheet 58 described above is preferably bonded to an EVA inner or base layer 60. FIGS. 21-24 illustrate section views of the gripping member 50 during various points of the manufacturing process according to some embodiments. FIG. 22 shows a section view of the EVA inner layer 60 covered by an adhesive upper layer 70 and protective tape 132 according to some embodiments. Suitable EVA sheets are available from the Ho Ya Electric Bond Factory, Xin Xing Ind. Area. Xin Feng W. Rd., Shi Jie Town Dong Guan City, Guan Dong, Province, China. In some embodiments, the EVA sheet 60 includes an adhesive 70 that is covered with a protective sheet 132 as shown in FIG. 22. The sheet 132 is removed prior to bringing the EVA sheet 60 into contact with the bottom side 62 of the polyurethane/felt sheet 58 (see FIG. 20). Alternatively, adhesive 70 can be sprayed or otherwise applied to one or both of the bottom side of the polyurethane/felt sheet 58 and/or the EVA sheet 60. FIG. 23 shows a section view of the polyurethane/felt sheet 58 and the EVA inner layer 60 after they have been joined. The finished sheet 50 can then be wound onto to a spool 134 to wait for further processing. Alternatively, it can be directed to another location for continuous further processing.

FIG. 21 shows the polyurethane/felt sheet 58 prior to being bonded to the EVA inner layer 60. FIG. 22 shows the EVA inner layer 60 prior to being bonded to the polyurethane/felt sheet 58. FIG. 23 shows the bonded polyurethane/felt/EVA sheet 50. In some embodiments, the polyurethane/felt sheet 58 is glued to the EVA inner layer 60.

Figure 26:
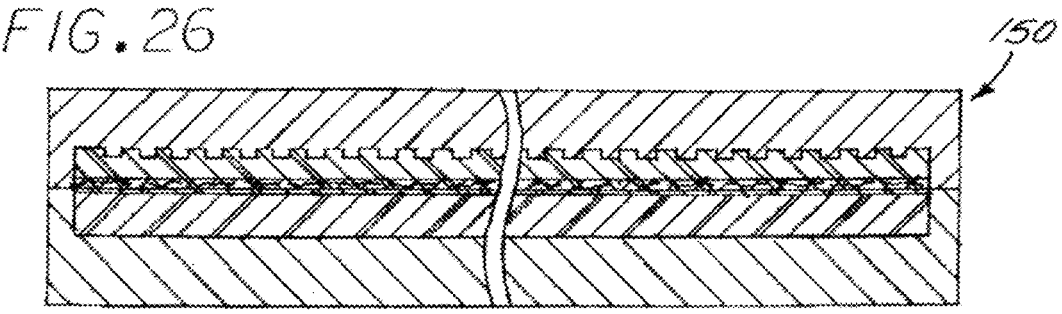
FIG. 26 is a schematic view of the gripping member shown in FIG. 25 in an apparatus for use in the manufacturing of a gripping member according to some embodiments.
Figure 27:
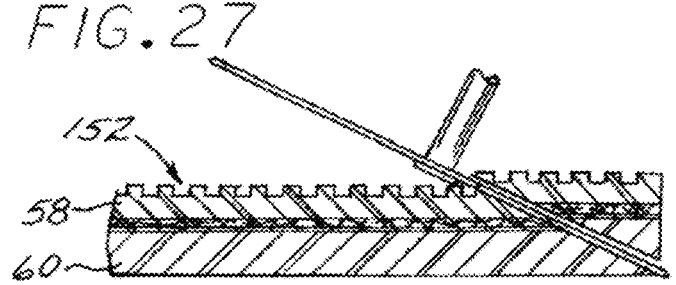
FIG. 27 is a schematic view of the gripping member shown in FIG. 25 being skived according to some embodiments.
Figure 28:
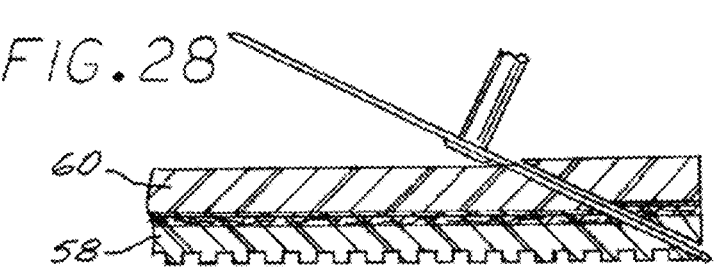
FIG. 28 is a schematic view of the gripping member shown in FIG. 25 being skived according to some embodiments.

Once formed, the polyurethane/felt/EVA sheet 50 can be cut into any suitable shape, such as the panel P shown in FIG. 25. The panel P includes first and second side edges 54, 56 and top and bottom edges 140, 142. FIG. 26 illustrates a mold 150 that can be used to form a friction enhancing pattern 152 on the top surface 64 of the polyurethane/felt/EVA sheet 50. FIGS. 27-28 show skiving tools that can be used to form skived edges on the sheet 50. In some embodiments, the first and second side edges 54, 56 can be skived through one or more layers of the panel P. In the illustrated embodiment, the skiving extends through at least a portion of all of the layers of the panel P. In some embodiments, the side edges 54, 56 are skived in a parallel fashion such that, when wrapped around the mounting surface 12, the edges 54, 56 overlap with like layers in contact with and glued to like layers along an angled seam 52. (See FIGS. 33, 35). In some embodiments, the side edges 54, 56 are skived in an anti-parallel fashion such that, when wrapped around the mounting surface 12, the seam 52 can be stitched with the outer surfaces 64 at or near the side edges 54, 56 contacting each other. (See FIG. 35A).

FIGS. 29-30 show the sleeve 2 on a mandrel 160 in preparation for application of a gripping member 50 according to some embodiments. In the illustrated embodiment, the cap 22 and nipple 14 are integrally formed with the body 12 of the sleeve 2. The nipple contact surface 18 extends radially from the mounting surface 12 at approximately 90 degrees. In some embodiments, the nipple contact surface 18 extends from the mounting surface 12 between approximately 45 and approximately 90 degrees. In some embodiments, the nipple contact surface 18 extends from the mounting surface 12 between approximately 90 and approximately 135 degrees. The cap contact surface 28 extends radially from the mounting surface 12 at approximately 90 degrees. In some embodiments, the cap contact surface 28 extends from the mounting surface 12 between approximately 45 and approximately 90 degrees. In some embodiments, the cap contact surface 28 extends from the mounting surface 12 between approximately 90 and approximately 135 degrees.

In some embodiments, the thickness of the panel P (FIG. 24) corresponds generally to the distance 190 the nipple contact surface 18 extends from the mounting surface 12 (FIG. 30) to facilitate the creation of a smooth transition from the gripping member 50 to the nipple 14. In some embodiments, the thickness 180 of the panel P corresponds generally to the distance 192 the cap contact surface 28 extends from the mounting surface 12 (FIG. 30) to facilitate the creation of a smooth transition from the gripping member 50 to the cap 22.

Figure 33:
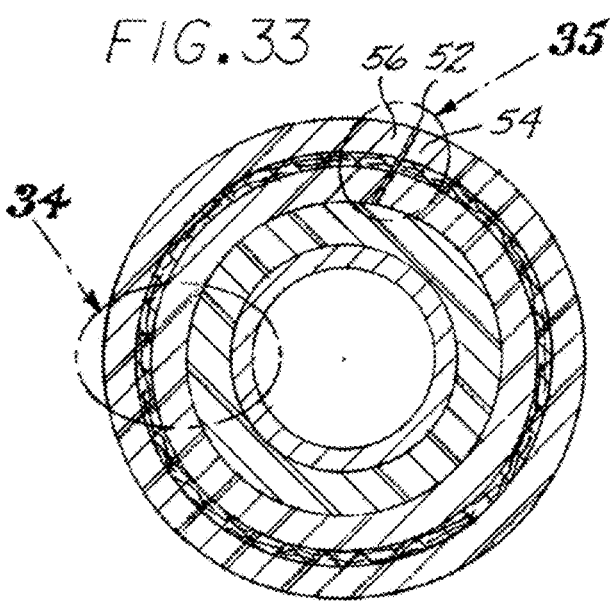
FIG. 33 is a section view of the grip shown in FIG. 32 according to some embodiments.
Figure 35:
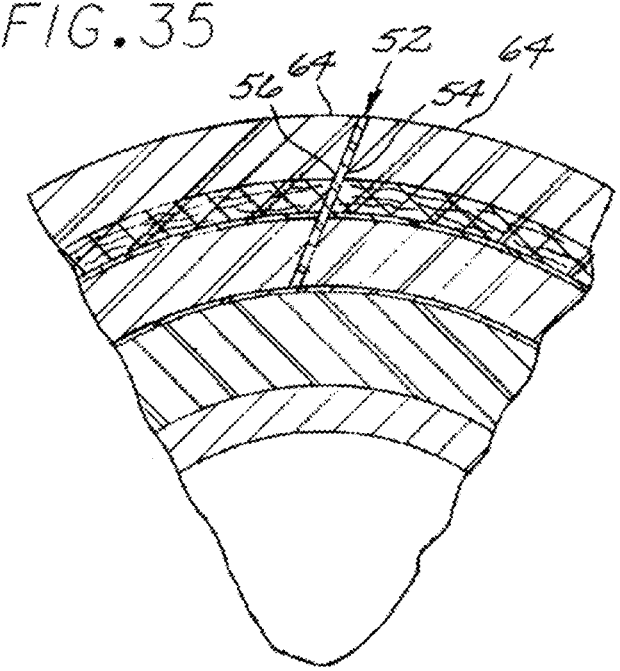
FIG. 35 is an enlarged view of a portion of the grip shown in FIG. 32 designated by the circle 35 in FIG. 33 according to some embodiments.
Figure 35A:
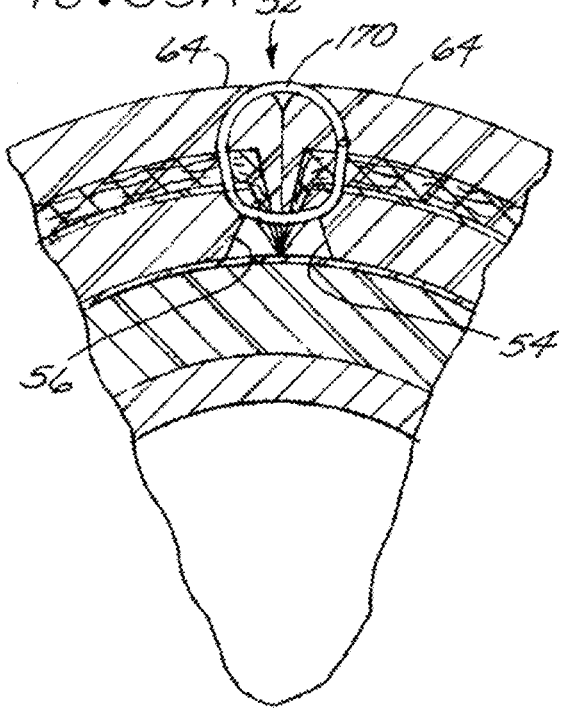
FIG. 35A is an enlarged view of an alternative configuration of the portion of the grip designated by the circle 35 in FIG. 33 according to some embodiments.

FIGS. 31-32 show the application of a gripping member 50 shaped like a panel P onto a sleeve 2 according to some embodiments. An adhesive 162 is sprayed onto the mounting surface 12 of the sleeve 2, the inner surface 66 of the gripping member 50 or both as shown and the panel P is wrapped around the mounting surface 12. As mentioned above, the side edges 54, 56 of the panel P can be skived so as to overlap along the seam 52 with like layers generally contacting like layers as shown in FIGS. 33 and 35. Alternatively, as shown in FIG. 35A, the side edges 54, 56 can be skived such that the outer surface 64 of the panel P at or near the side edges 54, 56 contact each other along the seam 52. In some embodiments, such a seam 52 is stitched closed with the stitches 170 preferably extending through the polyurethane/felt layer 58 and the EVA inner layer 60. In some embodiments, the stitching only extends through the polyurethane/felt layer 58. In some embodiments, the panel P is stitched inside out with the polyurethane surface 64 facing inwards and, after stitching the seam 52, the panel P is reversed as it is applied to the sleeve 2 such that, on the finished grip G, the polyurethane surface 64 is outward facing.

Figure 34:
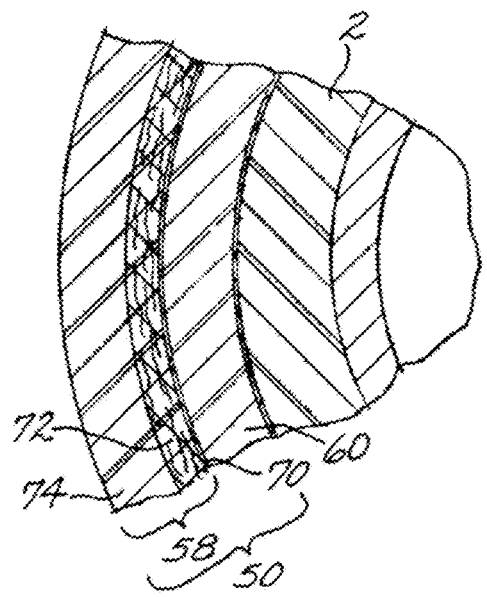
FIG. 34 is an enlarged view of a portion of the grip shown in FIG. 32 designated by the circle 34 in FIG. 33 according to some embodiments.

FIG. 34 shows a detail of the layering of some embodiments of the grip G. The outer layer 58 comprises polyurethane 74 and a substantially saturated thin felt member 72. The inner surface 62 of this outer layer can comprise both felt and polyurethane and is glued onto an EVA base layer 60. The EVA base layer 60, in turn, is glued to the mounting surface of an EVA sleeve 2.

Figure 36:
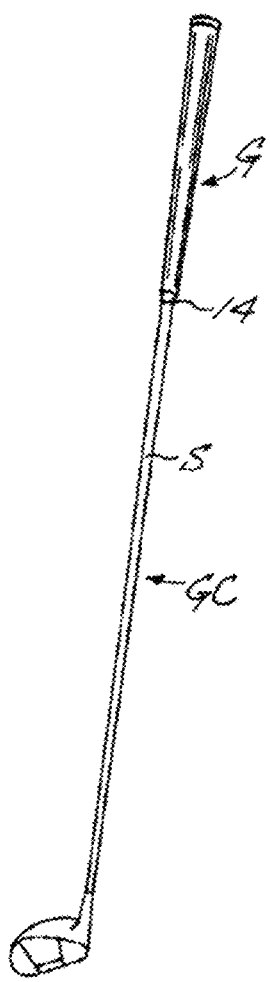
FIG. 36 is a perspective view of a golf club including a grip made according to some embodiments.

FIG. 36 shows a golf club GC with an alternative grip member G made according to the embodiments described above. In such an application, it may be advantageous to include a nipple 14 on the sleeve that is tapered so as to ease the transition from the club shaft S to the gripping member of the grip.

FIGS. 36-50 are SEM images of an embodiment of a grip G and various components of the grip G at different stages of the manufacturing process.

Figure 37:
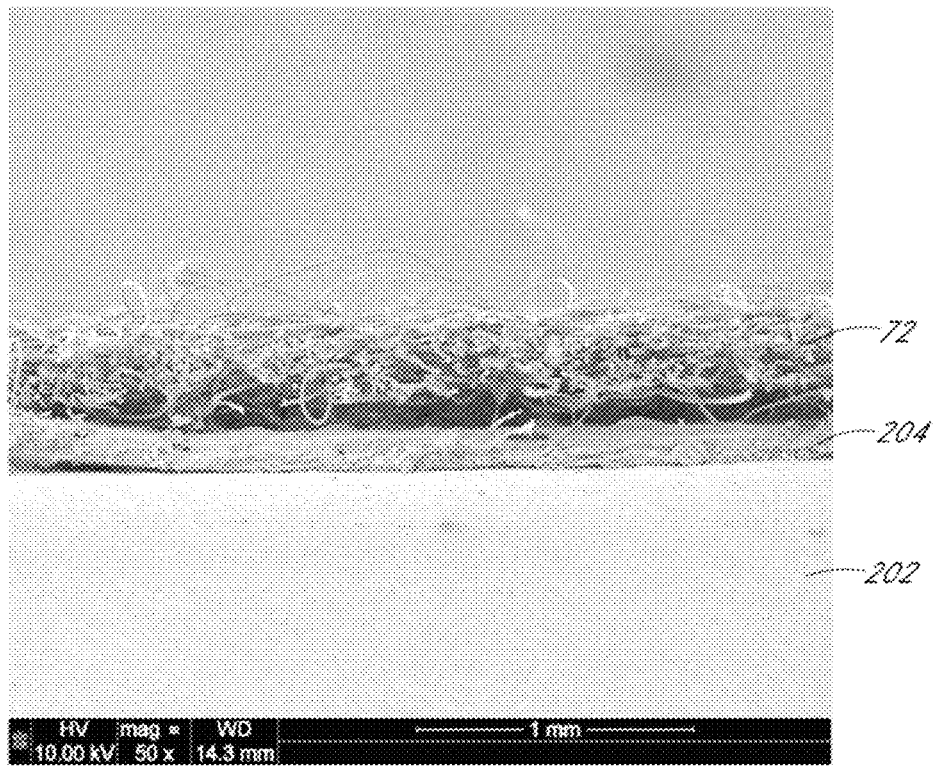
FIG. 37 is a SEM image of a cross-section of the component schematically illustrated in, for example, FIGS. 14-14B.

FIG. 37 is a SEM image of a cross-section of the thin fabric sheet 72 schematically illustrated in, for example, FIGS. 14-14B. To facilitate the imaging, the sheet 72 was attached to an SEM stub 202 (shown in the foreground/bottom of FIG. 37) with double sided carbon tape 204 (shown between the stub and component in FIG. 37). The stub 202 and the tape 204 are not illustrated in the schematics and are not part of the sheet 72.

Figure 38:
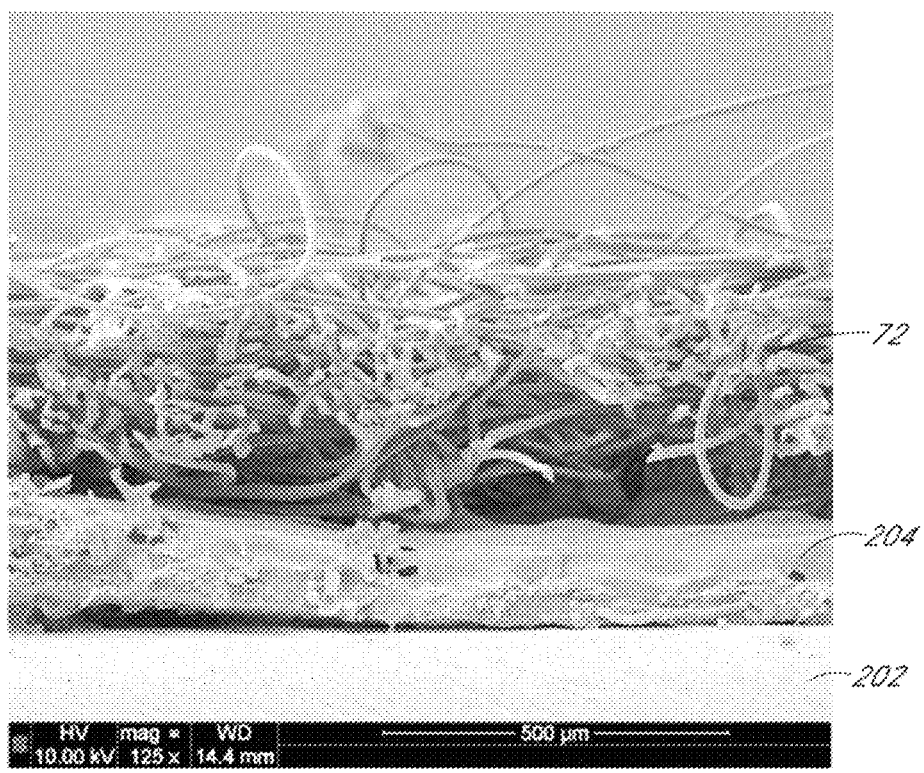
FIG. 38 is an enlarged SEM image of a portion of the cross-section shown in FIG. 37.

FIG. 38 is an enlarged SEM image of a portion of the cross-section shown in FIG. 37. The image also shows the SEM stub 202 and carbon tape 204 as described above with respect to FIG. 37.

Figure 39:
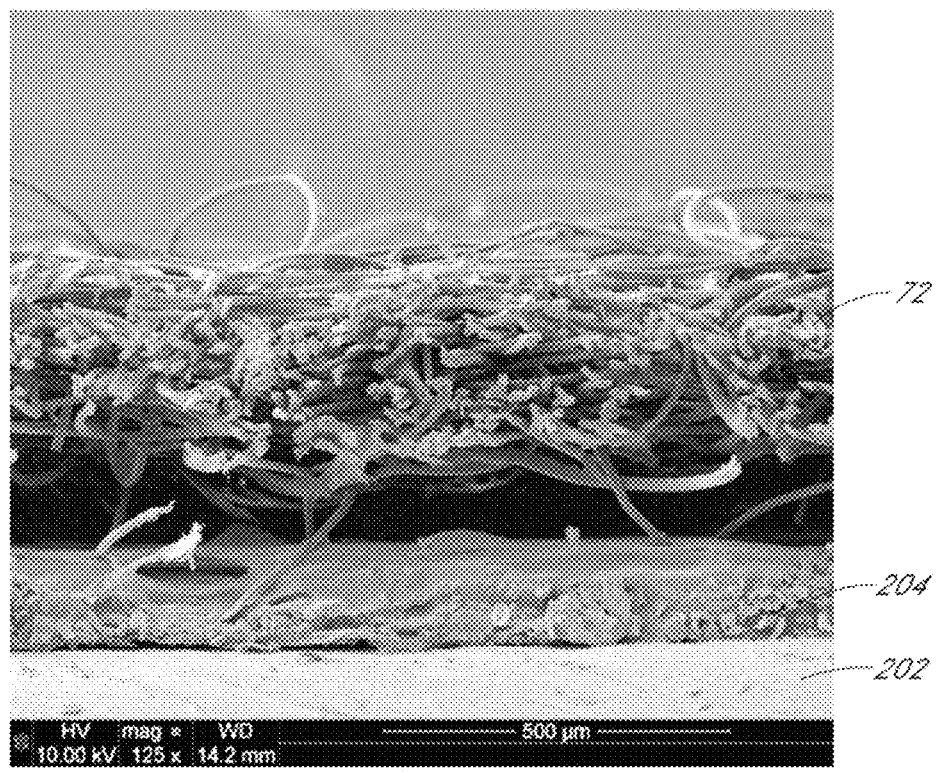
FIG. 39 is an enlarged SEM image of another portion of the cross-section shown in FIG. 37.

FIG. 39 is an enlarged SEM image of another portion of the cross-section shown in FIG. 37. The image also shows the SEM stub 202 and carbon tape 204 as described above with respect to FIG. 37.

Figure 40:
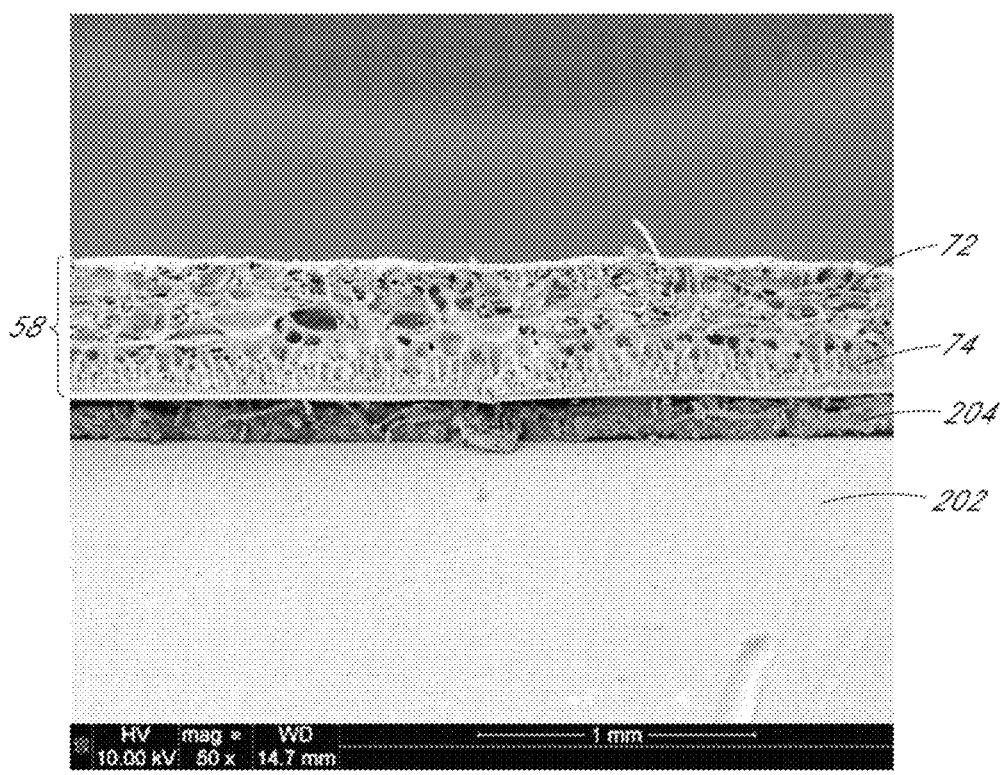
FIG. 40 is a SEM image of a cross-section of the component schematically illustrated in, for example, FIGS. 17 and 19.

FIG. 40 is a SEM image of a cross-section of the outer layer 58 schematically illustrated in, for example, FIGS. 17 and 19. The image also shows the SEM stub 202 and carbon tape 204 as described above with respect to FIG. 37. In addition, the outer layer 58 appears upside down as compared to the schematics (with the polyurethane 74 of the outer layer 58 in the illustrated embodiment attached to the stub 202 by the carbon tape 204 on the bottom of the image).

Figure 41:
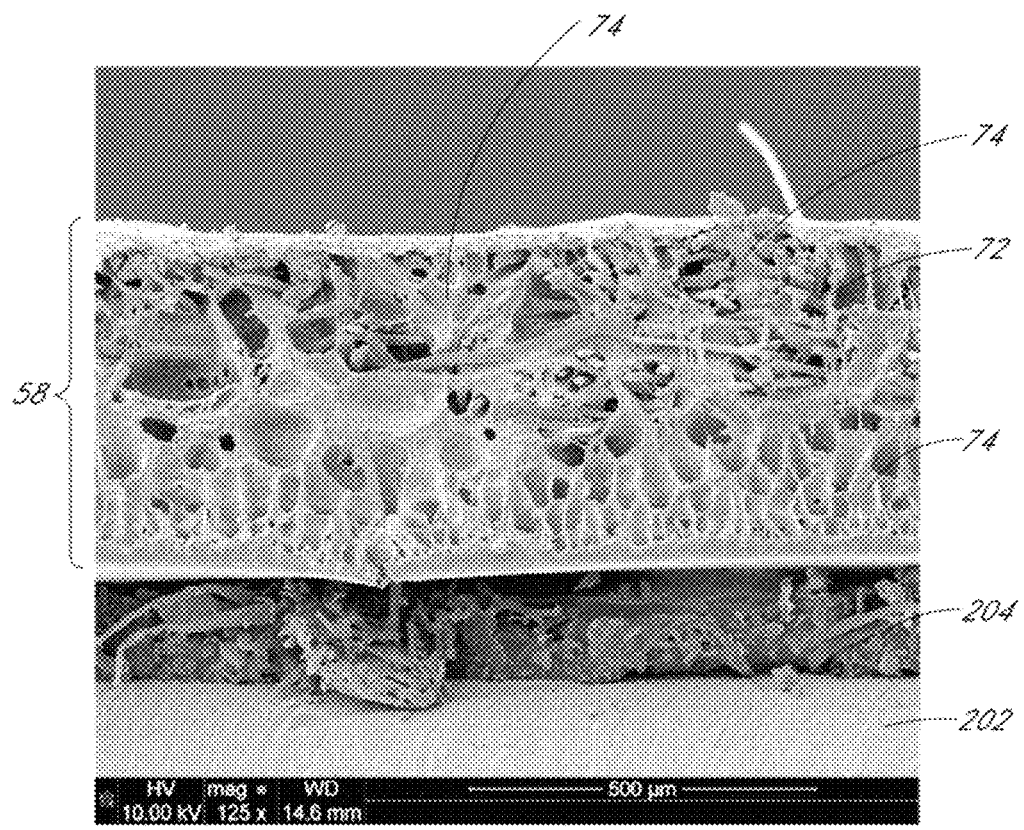
FIG. 41 is an enlarged SEM image of a portion of the cross-section shown in FIG. 40.

FIG. 41 is an enlarged SEM image of a portion of the cross-section shown in FIG. 40. The image also shows the SEM stub 202 and carbon tape 204 as described above with respect to FIG. 37. In addition, the outer layer 58 appears upside down as compared to the schematics (with the polyurethane 74 of the outer layer 58 in the illustrated embodiment attached to the stub 202 by the carbon tape 204 on the bottom of the image). Polyurethane 74 is also shown penetrating into sheet 72 as described above.

Figure 42:
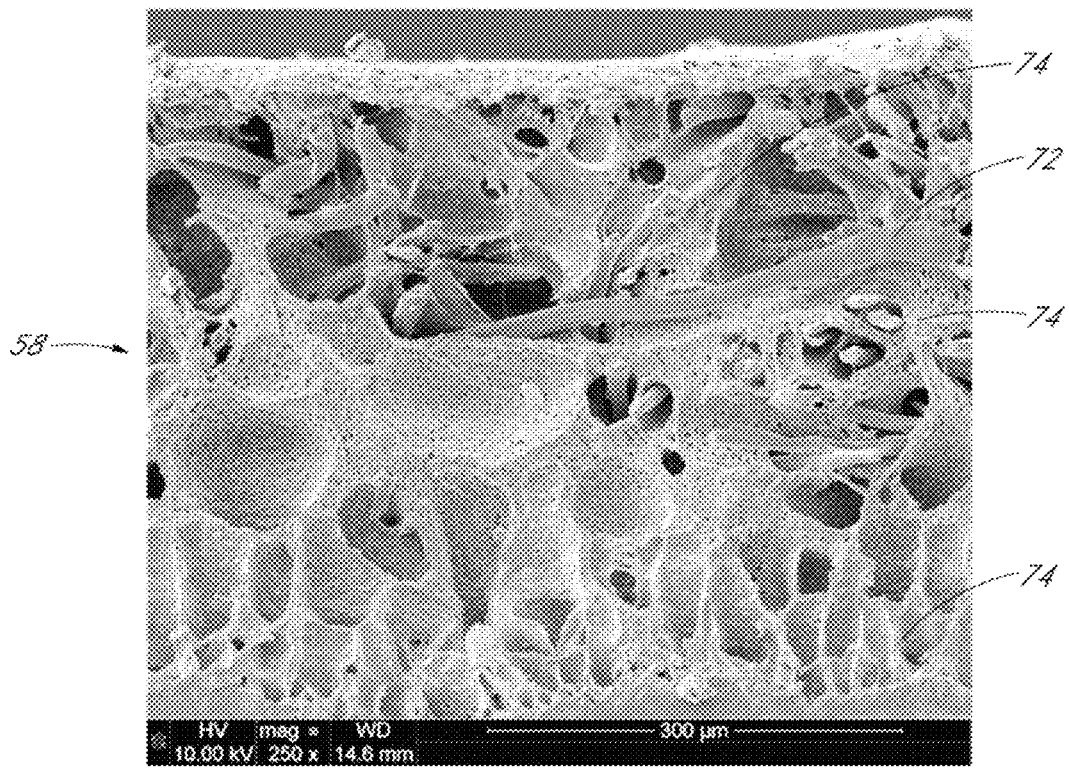
FIG. 42 is an enlarged SEM image of a portion of the enlarged cross-section shown in FIG. 41.

FIG. 42 is an enlarged SEM image of a portion of the enlarged cross-section shown in FIG. 41. The outer layer 58 appears upside down as compared to the schematics (with the polyurethane 74 of the outer layer 58 in the illustrated embodiment on the bottom). Polyurethane 74 is also shown penetrating into sheet 72 as described above.

Figure 43:
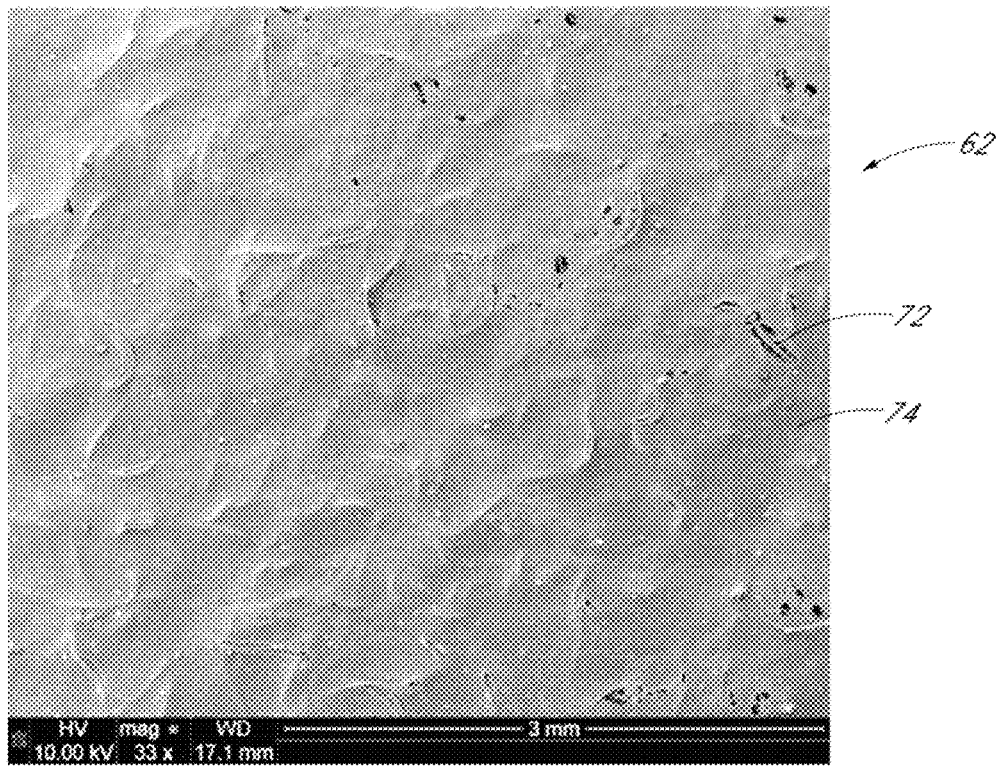
FIG. 43 is a SEM image of the bottom surface of the component schematically illustrated in, for example, FIGS. 17, 19, and 19A-B.

FIG. 43 is a SEM image of the bottom surface 62 of the outer layer 58 schematically illustrated in, for example, FIGS. 17, 19, and 19A-B.

Figure 44:
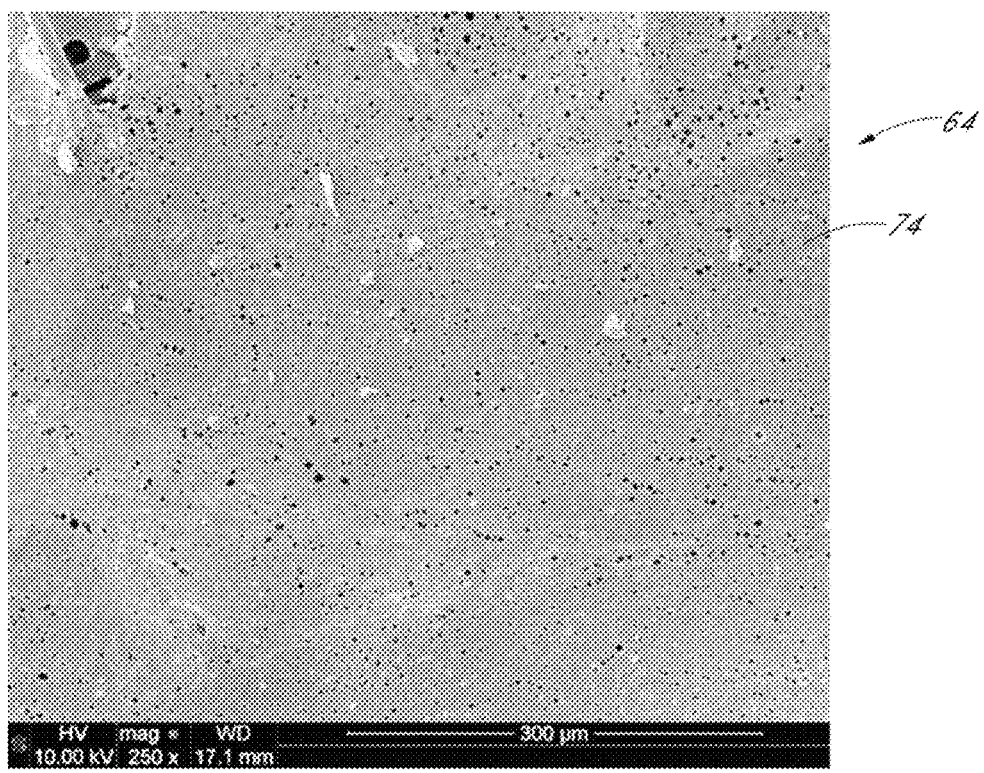
FIG. 44 is a SEM image of the top surface of the component schematically illustrated in, for example, FIGS. 17, 19, and 19A-B.

FIG. 44 is a SEM image of the top surface 64 of the outer layer 58 schematically illustrated in, for example, FIGS. 17, 19, and 19A-B.

Figure 45:
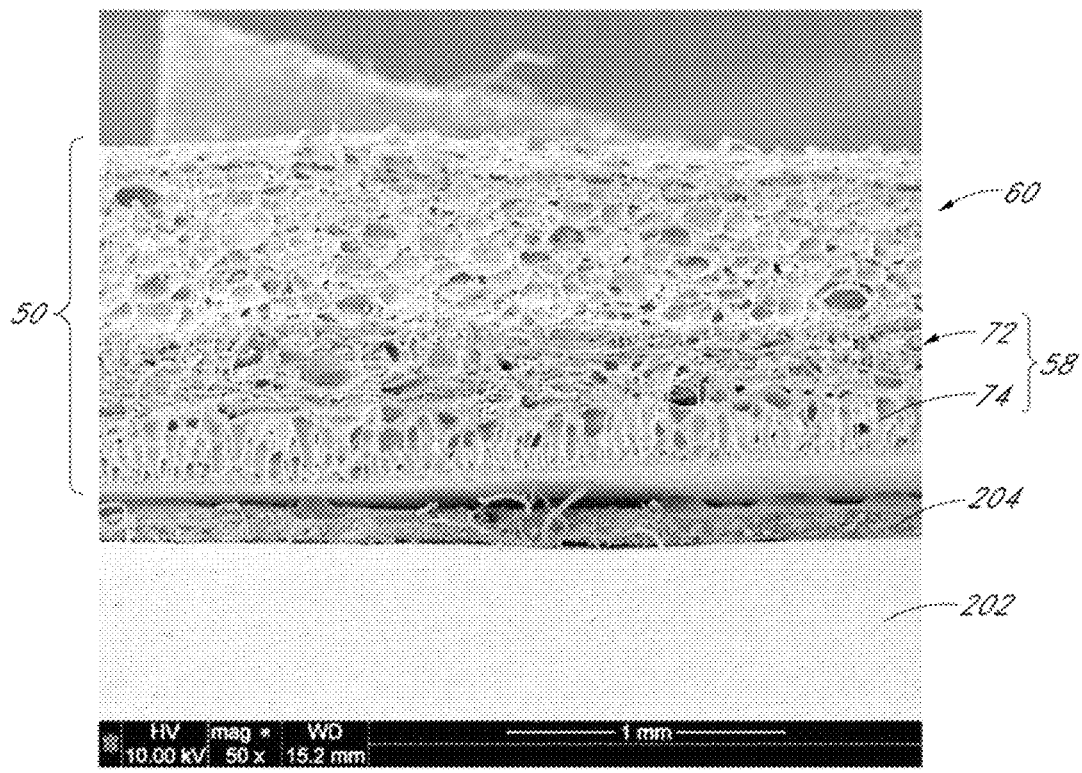
FIG. 45 is a SEM image of a portion of a cross-section of the gripping member schematically illustrated in, for example, FIGS. 23 and 24.

FIG. 45 is a SEM image of a portion of a cross-section of the gripping member 50 schematically illustrated in, for example, FIGS. 23 and 24. The image also shows the SEM stub 202 and carbon tape 204 as described above with respect to FIG. 37. In addition, the gripping member 50 appears upside down as compared to the schematics (with the polyurethane 74 of the outer layer 58 in the illustrated embodiment attached to the stub 202 by the carbon tape 204 on the bottom of the image).

Figure 46:
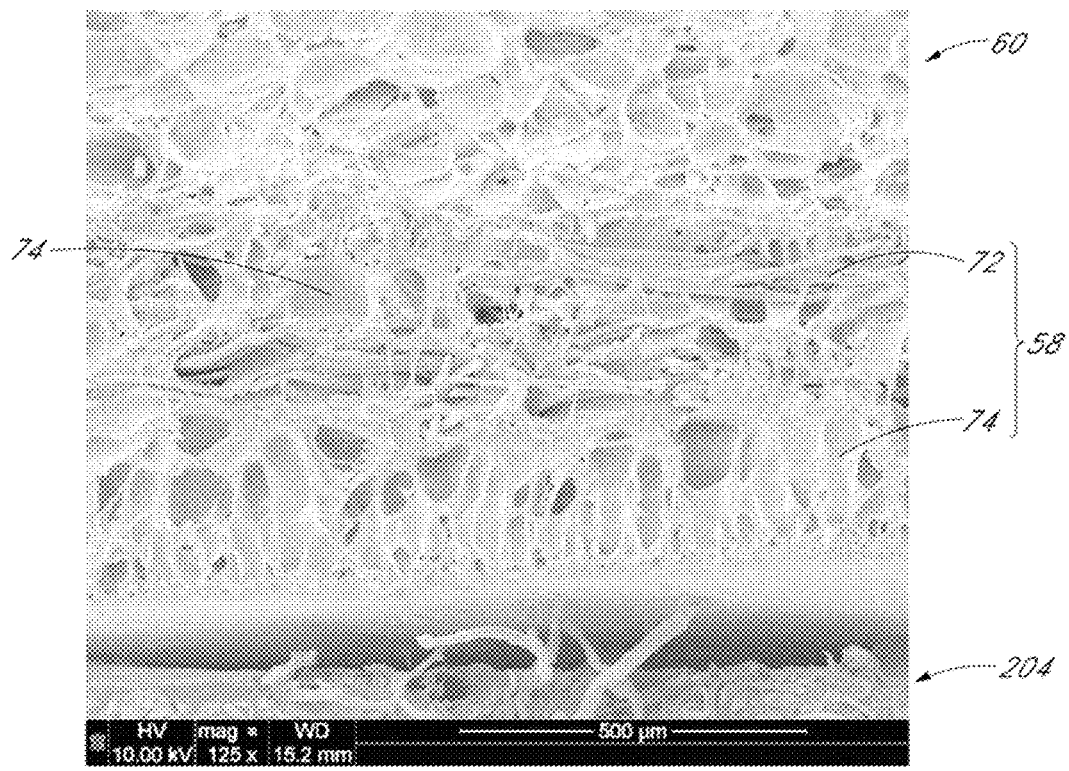
FIG. 46 is an enlarged SEM image of a portion of the cross-section shown in FIG. 45.

FIG. 46 is an enlarged SEM image of a portion of the cross-section shown in FIG. 45. The image also shows the carbon tape 204 as described above with respect to FIG. 37. In addition, the gripping member 50 appears upside down as compared to the schematics (with the polyurethane 74 of the outer layer 58 in the illustrated embodiment attached to the carbon tape 204 on the bottom of the image). Polyurethane 74 is also shown penetrating into sheet 72 as described above.

Figure 47:
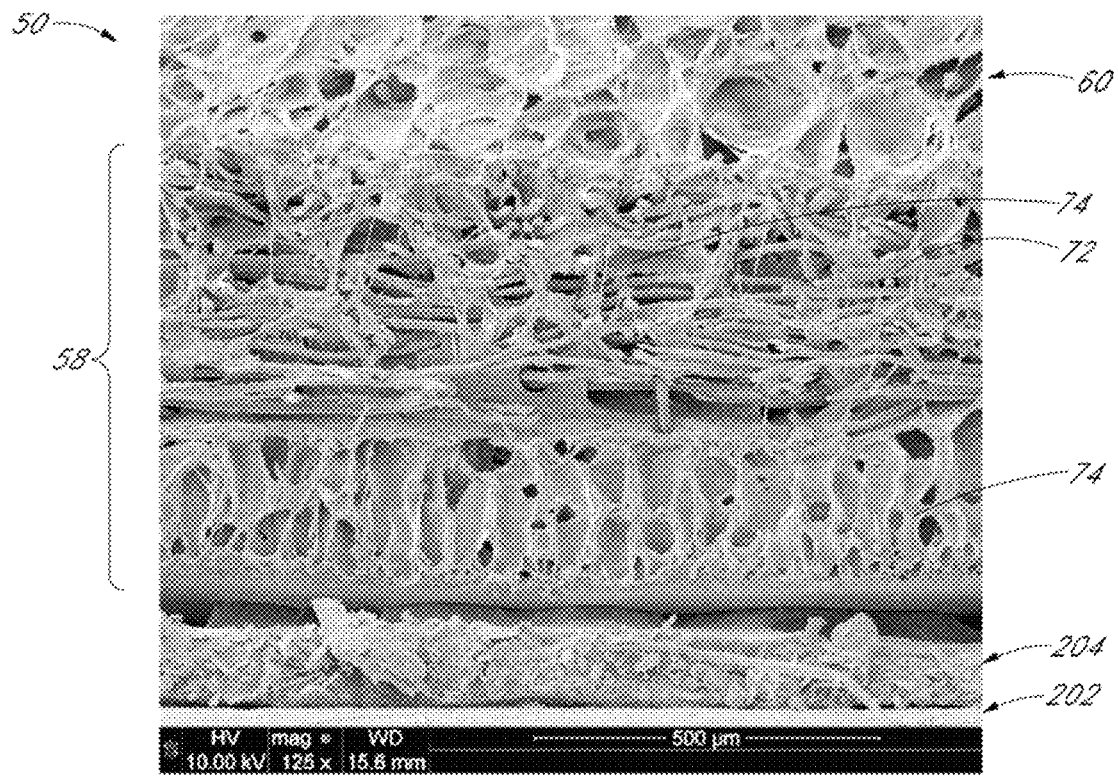
FIG. 47 is an enlarged SEM image of another portion of the cross-section shown in FIG. 45.

FIG. 47 is an enlarged SEM image of another portion of the cross-section shown in FIG. 45. The image also shows the carbon tape 204 as described above with respect to FIG. 37. In addition, the gripping member 50 appears upside down as compared to the schematics (with the polyurethane 74 of the outer layer 58 in the illustrated embodiment attached to the stub 202 by the carbon tape 204 on the bottom of the image). Polyurethane 74 is also shown penetrating into sheet 72 as described above.

Figure 48:
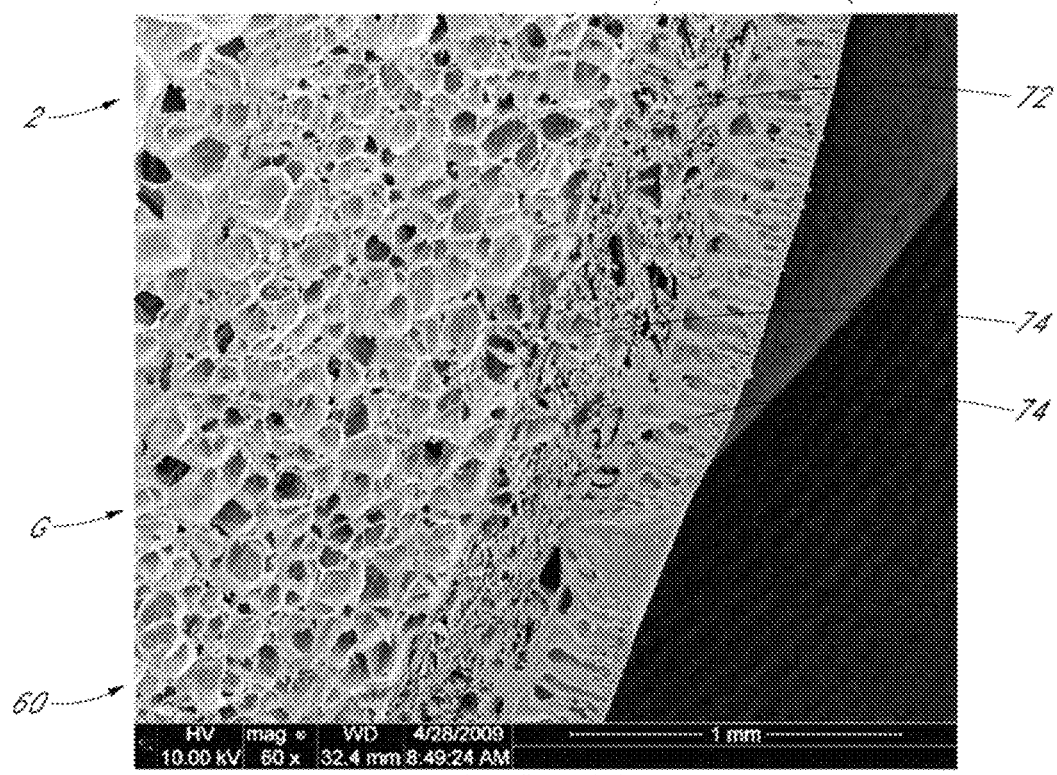
FIG. 48 is a SEM image of a portion of a cross-section of the grip G schematically illustrated in, for example, FIGS. 32-34.

FIG. 48 is a SEM image of a portion of a cross-section of the grip G schematically illustrated in, for example, FIGS. 32-34. The imaged component G shows the outer layer 58 on the right hand side of the image. Polyurethane 74 is also shown penetrating into sheet 72 as described above.

Figure 49:
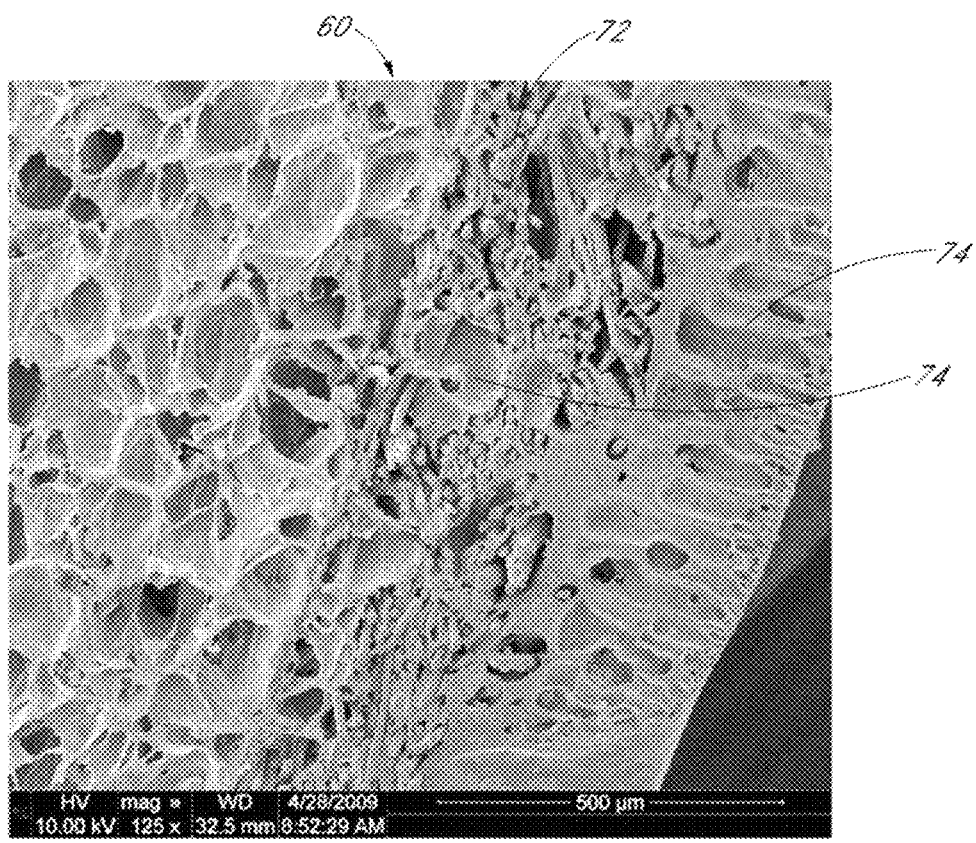
FIG. 49 is an enlarged SEM image of a portion of the cross-section shown in FIG. 48.

FIG. 49 is an enlarged SEM image of a portion of the cross-section shown in FIG. 48. The imaged grip G shows the outer layer 58 on the right hand side of the image. Polyurethane 74 is also shown penetrating into sheet 72 as described above.

Figure 50:
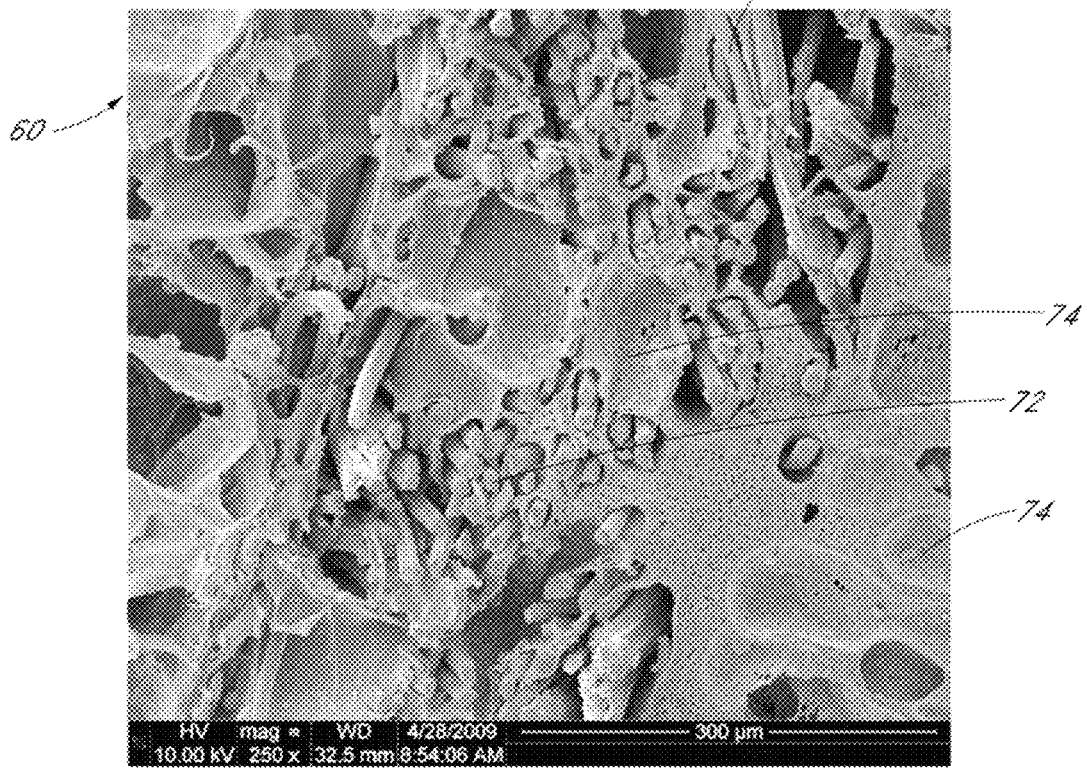
FIG. 50 is an enlarged SEM image of a portion of the cross-section shown in FIG. 49.

FIG. 50 is an enlarged SEM image of a portion of the cross-section shown in FIG. 49. The imaged grip G shows the outer layer 58 on the right hand side of the image. Polyurethane 74 is also shown penetrating into sheet 72 as described above.

In some embodiments, the EVA sleeve 2 is injection molded rather than ground down from a block of EVA foam. Ethylene vinyl acetate copolymers possess many excellent characteristics such as low weight, low density, flexibility, transparency, non-toxicity and good resistance to environmental stress cracking, etc. Some embodiments of the present invention overcome the difficulties of working with injection molded EVA. For example, EVA coagulation is a relatively slow process. After injection molding a rough EVA sleeve, a core bar can be inserted inside the sleeve 2 and the sleeve 2 can be transferred to an appropriate mold to control the shape of the finished product. Controlling temperature and time facilitates effective control of the EVA coagulation. In some embodiments, the density of the EVA included in the sleeve is less than approximately 1 g/cm$^3$. In some embodiments, the density is between approximately 0.9 and 1 g/cm$^3$. In a preferred embodiment, the density is between approximately 0.930 and 0.943 g/cm$^3$. Controlling the degree of coagulation of the EVA allows embodiments of the invention to include an EVA sleeve whose volume is, for example, approximately doubled or tripled from the original volume. Therefore, in some embodiments, the density of the finished sleeve 2 can be approximately one half or one third of the original density.

Articles having an exchangeable handle are described herein with particular reference to fishing poles. Such exchangeable handles can be especially advantageous for replacing worn or damaged grips easily and/or for customizing the fishing poles by exchanging the handles to suit a particular situation. Although described in the context of fishing poles, the exchangeable handles described herein can be applied to other articles such as golf clubs, tennis rackets and hand tools.

FIG. 51 is a perspective view of a fishing pole having a handle 1020 and a rod portion 1060 according to some embodiments. As illustrated in FIG. 52, the handle 1020 can be disconnected from the rod portion 1060, such that the handle 1020 is interchangeable with other handles. In the illustrated embodiment, the handle 1020 can be coupled to the rod portion 1060 through a threaded connection, as described in further detail below. However, other types of connections are also contemplated.

Figure 53:
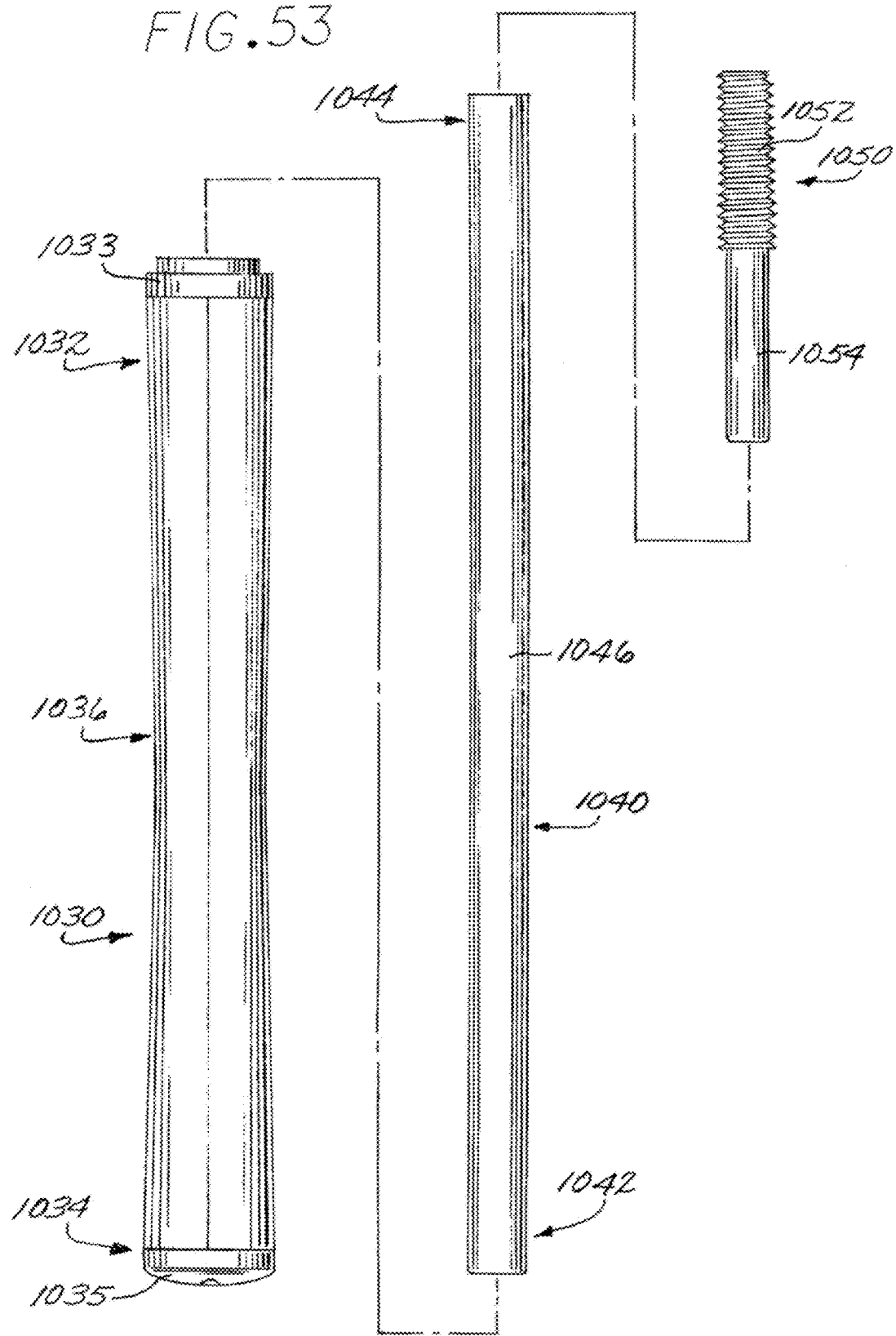
FIG. 53 is an exploded side plan view of a handle of a fishing pole in FIG. 51 according to some embodiments.

As illustrated in the exploded assembly view of FIG. 53, the handle 1020 can comprise a grip portion 1030, a tubular shaft 1040, and a threaded adapter 1050. In the illustrated embodiment, the grip portion 1030 is an elongate cylindrical member having a first end 1032 and second end 1034. Preferably, the portions towards the first end 1032 and the second end 1034 have a larger diameter than the middle portion 1036 of the grip portion 1030, such that the grip portion 1030 has a generally hourglass shape. In some embodiments, middle portion 1036 is disposed closer to the first end 1032 than the second end 1034. In some embodiments, middle portion 1036 is disposed closer to the second end 1034 than the first end 1032. In some embodiments, the grip portion 1030 can have substantially a constant diameter through its longitudinal length. In some embodiments, the grip portion 1030 can have enlarged stop members (not illustrated) toward the first end 1032 and/or second end 1034 to help prevent the handle 1020 from inadvertently releasing from the user's control. In some embodiments, the grip portion 1030 can have a cross-section of any shape, such as for example triangular, square or hexagonal. Grip portions 1030 having a shaped cross-section are advantageous for applying torque to the handle 1020 about the longitudinal axis. In other embodiments, the grip portion 1030 can have other configurations commonly known in the art for article grips.

In the illustrated embodiment, the length of the grip portion 1030 is approximately 22 cm. In some embodiments, the grip portion 1030 can range from about 9 cm to about 30 cm. In other embodiments, the grip portion 1030 can be any desired length suitable for an application. The width or diameter of the grip portion 1030 in the illustrated embodiment is about 2.4 cm at the middle portion 1036 and about 2.5 at the first and second portions 1042, 1044. In other embodiments, the width of the grip portion 1030 can be any dimension to allow gripping by a user.

In some embodiments, the grip portion 1030 includes an inner body 1037 (see, e.g. FIG. 55) and an outer gripping portion 1031. In some embodiments, inner body 1037 is made of one or more resilient materials, for example rubber and/or ethylene-vinyl-acetate (EVA). In other embodiments, the grip portion 1030 can be made of other supporting materials, including metals, fiberglass, and composites. In some embodiments, outer gripping portion 1031 can be made of one or more layers of material, including EVA, polyurethane, and/or felt. In some embodiments, grip portion 1030 can be made of a substantially unitary piece, for example cork or EVA. In some embodiments, the outer gripping portion 1031 can be made of other suitable materials, such as for example rubber, cork, plastics or composites.

The grip portion 1030 can be covered with an outer gripping portion 1031 that provides the desired shock transmission, tackiness, and torsion resistance required of a grip for a fishing pole. In some embodiments, the outer gripping portion 1031 can be a sleeve that includes a cavity configured to receive at least a portion of the body 1037 of the grip portion 1030 of a fishing pole, rod, or other article. In the illustrated embodiment, the body 1037 includes an opening at the first end 1032 adapted to receive the tubular shaft 1040 and a second end 1034 including a substantially enclosed closed end.

In some embodiments the first end 1032 of the grip portion 1030 can include a nipple 1033, which can be a stepped structure configured to accommodate a complimentary mating portion of the rod portion 1060, as described in further detail below. Alternatively, in some embodiments the nipple 1033 may be tapered to provide a smoother transition from the rod portion 1060 or tubular shaft 1040 to the grip portion 1030. The nipple 1033 can be integrally formed with the grip portion 1030 or can be separately formed and later joined to the grip portion 1030. As shown, in some embodiments, the nipple 1033 can define a circumferential nipple ledge extending around the grip cavity 1038. The nipple ledge may comprise a nipple contact surface and a nipple outer surface.

As shown, in some embodiments the second end 1034 of the grip portion 1030 can include a cap 1035. The cap 1035 may include an opening to facilitate the escape of air as a shaft is inserted into the grip portion 1030. The cap 1035 may define a generally convex shape on its end. In some embodiments, the cap defines a circumferential cap ledge extending around the grip portion 1030. The cap ledge comprises a cap contact surface and a cap outer surface.

In the illustrated embodiment, the cap 1035 and nipple 1033 are integrally formed with the body 1037 of grip portion 1030. In some embodiments, the cap 1035 and nipple 1033 are made from the same material as the body 1037 so as to seamlessly or virtually seamlessly blend in with the body. Alternatively, the cap 1035 and nipple 1033 can be a different material to facilitate the placement of material having different rigidity or other characteristics at the ends of the grip portion 1030.

In some embodiments, the outer gripping portion 1031 can be a panel that wraps around the body 1037. In other embodiments, the outer gripping portion 1031 can be a flat strip that can be spirally wrapped around the body 1037. Preferably, the outer gripping portion 1031 includes an adhesive tape layer to hold the wrap to the body 1037. In some embodiments, the outer gripping portion 1031 can have a textured surface to facilitate better gripping.

Additional disclosure of embodiments of grips for fishing poles can be found in U.S. Pat. Nos. 7,770,321 and 8,424,236, which are incorporated herein by reference in their entireties.

The grip portion 1030 can be configured to accept a tubular shaft 1040, as illustrated in FIG. 55 and described in further detail below. In the illustrated embodiment, an elongate grip cavity 1038 extends longitudinally through the middle of the grip portion 1030 and is open at the first end 1032. Preferably, the second end 1034 is closed to provide a stop for the tubular shaft 1040. In preferred embodiments, the elongate grip cavity 1038 extends almost through the entire length of the grip portion 1030. In the illustrated embodiment, the elongate grip cavity 1038 is about 20 cm. In some embodiments, the elongate grip cavity 1038 can extend through a partial length of the grip portion 1030. In other embodiments, the elongate grip cavity 1038 can be a through hole that extends the entire length of the grip portion 1030.

With continued reference to FIG. 53, the tubular shaft 1040 can be an elongate cylinder with a hollow core, such that the tubular shaft 1040 has an annular cross-sectional area. The tubular shaft 1040 can have a first portion 1042 and a second portion 1044 opposite the first portion 1042. The first portion 1042 is configured to couple with the grip cavity 1038 of the grip portion 1030. In preferred embodiments, the first portion 1042 of the tubular shaft 1040 has an outer surface 1046 that is generally smooth and couples with a generally smooth surface of the grip cavity 1038. In preferred embodiments, the tubular shaft 1040 is made of a rigid and strong material, such as metals, rigid plastics, fiberglass, and/or composites. For example, the tubular shaft 1040 can be made of Delrin®, which is rigid yet easily machineable.

In some embodiments, the tubular shaft 1040 can be secured to the grip cavity 1038 of the grip portion 1030 with an adhesive commonly known in the art, but preferably waterproof adhesive. In embodiments where adhesive is used, the outer surface 1046 of the tubular shaft 1040 and/or the surface of the grip cavity 1038 can include a textured surface to enhance the bonding of the adhesive to the surfaces.

In other embodiments, friction between the tubular shaft 1040 and the grip cavity 1038 can be sufficient to secure the two members together. For example, the outer diameter of the tubular shaft 1040 can be slightly larger than the diameter of the grip cavity 1038 such that an interference fit is created. At least one of the tubular shaft 1040 or grip cavity 1038 can include a material that provides high sliding friction, such as rubber.

In alternative embodiments, the tubular shaft 1040 can be fastened to the grip cavity 1038. In some embodiments, the tubular shaft 1040 can include outer threads on the first portion 1042 that are configured to cooperate with complimentary inner threads in the grip cavity 1038 to secure the tubular shaft 1040 to the grip portion 1030. In some embodiments, the threads in grip cavity 1038 can be disposed on an insert (not shown) that is positioned within the grip cavity 1038. The insert can be used where the grip portion 1030 material is not favorable for forming threads. The insert can advantageously be made of a stronger material, such as metal or rigid plastic, that can provide the desired structural rigidity to support thread coupling. Similarly, a threaded sleeve (not shown) can be provided on the tubular shaft 1040.

In other embodiments, the grip portion 1030 can include a threaded hole extending laterally from the exterior surface of the grip portion 1030 to the cavity for accepting a set screw that can be engaged with the tubular shaft 1040 to secure it inside the grip cavity 1038. In still other embodiments, other means of securing the tubular shaft 1040 to the grip portion 1030 can be used, such as for example hooks or latches. In some embodiments, the tubular shaft 1040 and grip portion 1030 can be a unitary piece that are formed together. The tubular shaft 1040 and grip portion 1030 can be machined or molded from a single piece of material.

In the illustrated embodiment, the length of the tubular shaft 1040 is approximately 27 cm. In some embodiments, the length can range from approximately 3 cm to approximately 30 cm. Preferably, the length of the tubular shaft 1040 is at least as long as the length of the grip cavity 1038 of the grip portion 1030. The illustrated embodiment of the tubular shaft 1040 has an outer surface 1046 with a diameter of about 1.3 cm and an inner surface 1048 with a diameter of about 0.8 cm. In some embodiments, the diameter of the outer surface 1046 can range from approximately 1 cm to approximately 2 cm. In some embodiments, the diameter of the inner surface 1048 can range from approximately 0.3 cm to approximately 1 cm.

With continued reference to FIG. 53, the threaded adapter 1050 is an elongate member comprising a threaded portion 1052 and a shaft portion 1054. The shaft portion 1054 is configured to couple with the inner surface 1048 of the tubular shaft 1040. In the illustrated embodiment, the shaft portion 1054 has a generally smooth surface and can slide into the tubular shaft 1040. In the illustrated embodiments, the shaft portion 1054 has a diameter of approximately 0.8 cm. In some embodiments, the diameter of the shaft portion 1054 can range from approximately 0.3 cm to approximately 1 cm. In other embodiments, the diameter of the shaft portion 1054 can be any size to fit into the tubular shaft 1040.

In some embodiments, the shaft portion 1054 can be configured to resist rotational movement of the threaded adapter 1050 within the tubular shaft 1040. For example, the shaft portion 1054 can include ridges that extend along its longitudinal length to resist rotation. In other embodiments, the shaft portion 1054 can include a hexagonal shape, a notch or a textured surface to resist rotation. In the illustrated embodiment, the length of the shaft portion 1054 is about 6 cm. In some embodiments, the length of the shaft portion 1054 can range from approximately 1 cm to approximately 30 cm.

In the illustrated embodiment, the threaded portion 1052 comprises outer threads that are configured to cooperate with complimentary threads on the rod portion 1060, as described in further detail below. In the illustrated embodiment, the length of the threaded portion 1052 is approximately 6 cm. However, the threaded portion 1052 can range from approximately 1 cm to approximately 10 cm.

The threaded adapter 1050 is preferably made of a rigid material that is favorable for thread formation. For example, the threaded adapter 1050 can be made of a metal, composite, or rigid plastic, such as aluminum, Delrin®, or polyethylene. In other embodiments, the threaded adapter 1050 can be made of any other material having sufficient strength to withstand the forces experienced by the handle 1020.

The threaded adapter 1050 and tubular shaft 1040 can be coupled by any means, such as those described above for the coupling of the grip portion 1030 and tubular shaft 1040. For example, the coupling means can include adhesives, threaded connections, or set screws. In some embodiments, the threaded adapter 1050 can be made as a unitary piece with the tubular shaft 1040. The threaded adapter 1050 and the tubular shaft 1040 can be machined or molded into a single piece.

In some embodiments, the threaded adapter 1050 can be a hollow sleeve with outer threads configured to fit around the outer surface 1046 of the tubular shaft 1040. In these embodiments, the tubular shaft 1040 can have a reduced outer diameter along the second portion 1044 where the hollow threaded adapter 1050 is positioned to account for the additional diameter from the hollow threaded adapter 1050.

FIGS. 54 and 55 illustrate an embodiment of an assembled handle 1020. The tubular shaft 1040 can be inserted into the grip portion 1030 and secured together through any of the means described above. In some embodiments, for example when adhesives are incorporated, the outer surface 1046 of the tubular shaft 1040 and/or the grip cavity 1038 of the grip portion 1030 can be provided with a lubricant to assist assembly. Preferably, the lubricant will dry or will otherwise lose its lubricity after time for a more secure fit.

In the illustrated embodiment, the tubular shaft 1040 is inserted into generally the entire length of the grip portion 1030. In some embodiments, the length of the tubular shaft 1040 is greater than the length of the grip portion 1030, resulting in a portion of the tubular shaft 1040 extending outside of the grip cavity 1038, as illustrated in FIGS. 54 and 55. Though shown extending beyond the grip cavity 1038, in some embodiments the tubular shaft 1040 and the grip cavity 1038 can be commensurate or approximately equal in length. In some embodiments the grip cavity 1038 can extend beyond the tubular shaft 1040. In the illustrated embodiment, the tubular shaft 1040 extends about 6 cm outside of the grip cavity 1038. In other embodiments, the tubular shaft 1040 may extend less or more than 6 cm outside of the grip cavity 1038. As described above, in some embodiments, the tubular shaft 40 may not extend outside of the grip cavity 1038. In some embodiments, the tubular shaft 1040 can be shorter in length than the length of the grip portion 1030. However, the tubular shaft 1040 can be inserted only partially into the length of the grip portion 1030, wherein a portion of the tubular shaft 1040 still extends outside of the grip cavity 1038.

With continued reference to FIGS. 54 and 55, the threaded adapter 1050 can be inserted into the second portion 1044 of the tubular shaft 1040 and coupled together by any of the means described above. In the illustrated embodiment, the threaded adapter 1050 is inserted about 6 cm into the tubular shaft 1040. In other embodiments, the threaded adapter 1050 can be inserted more or less than 6 cm into the tubular shaft 1040.

With reference to FIGS. 52 and 56, the rod portion 1060 can include a connector portion 1062 having a connector cavity 1064. The connector cavity 1064 can have features complimentary to the assembled handle 1020 for releasably securing the handle to the rod portion 1060. In the illustrated embodiment, the connector cavity 1064 is an elongate aperture with inner threads disposed along the distal portion 1066 of the connector cavity 1064 that are complimentary to the outer threads on the handle 1020. The rod portion 1060 can also comprise a depression 1070 at the proximal end 1068 of the connector cavity 1064 that is configured to mate with the nipple 1033 on the grip portion 1030.

Figure 57:
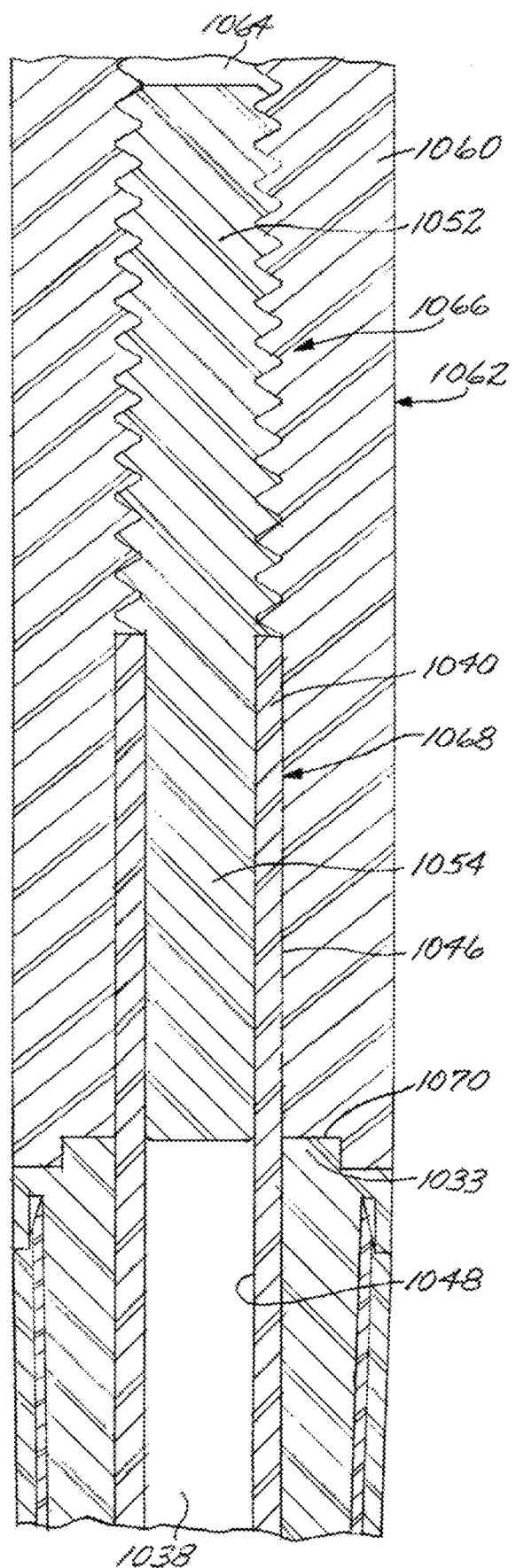
FIG. 57 is a close-up cross-sectional plan view of the fishing pole shown in FIG. 56, taken at detail 57.

As illustrated in FIG. 57, the tubular shaft 1040 and the threaded adapter 50 of the handle 1020 can be inserted into the connector cavity 1064 until the outer threads on the handle 1020 engage the inner threads in the connector cavity 1064. As the connection is tightened, the handle 1020 is drawn toward the rod portion 1060. Preferably, the threaded portion 1052 of the threaded adapter 1050 is longer than the length of the inner threads of the connector cavity 1064 so that the handle can be inserted sufficiently into the rod portion 1060 to form a tight junction between the depression 1070 and the nipple 1033, as illustrated in FIG. 57. In some embodiments, the tubular shaft 1040 can mate with the inner walls of the connector cavity through a interference or tight fit to provide additional rigidity to the assembly.

Although described with reference to a threaded connection between the handle 1020 and rod portion 1060, other connection means are also contemplated. In alternate embodiments, the coupling between the handle 1020 and the rod portion 1060 can include any connection means that provides a rigid, yet releasable attachment. For example, the coupling can include latches, hooks, or quarter-turn connections.

Although certain embodiments, features, and examples have been described herein, it will be understood by those skilled in the art that many aspects of the methods and devices illustrated and described in the present disclosure may be differently combined and/or modified to form still further embodiments. For example, any one component of the exchangeable handle and gripping portion illustrated and described above can be used alone or with other components. Additionally, it will be recognized that the methods described herein may be practiced in different sequences, and/or with additional devices as desired. Such alternative embodiments and/or uses of the methods and devices described above and obvious modifications and equivalents thereof are intended to be included. Thus, it is intended that the scope of this disclosure should not be limited by the particular embodiments described above.

The invention has been described in terms of certain preferred embodiments. One or more aspects of each of the embodiments can be combined with one or more aspects of other embodiments and such combinations are specifically contemplated herein. Further, general modifications of the disclosure are also contemplated.

What is claimed is:

1. A grip configured for use with a handle portion of an article, the grip comprising:
   a sleeve member defining a mounting surface, the sleeve member comprising:
      a hollow cavity configured to receive at least a portion of the handle portion of the article; and
   a gripping member joined to the sleeve member, the gripping member comprising:
      a layer comprising a first fabric and polyurethane, the polyurethane penetrating through and saturating into the first fabric and extending beyond an outer surface of the first fabric, an outer portion of the layer comprising pores,
   wherein the polyurethane and the first fabric cooperate to define an exposed inner surface for the layer, the exposed inner surface being primarily polyurethane and including fibers of the first fabric, the inner surface of the layer being joined to the sleeve member.

2. The grip of claim 1, wherein an end of the sleeve member comprises a cap, the cap defining a circumferential cap ledge extending around the sleeve member and extending radially outward from the mounting surface of the sleeve member adjacent the mounting surface, wherein the cap ledge comprises a cap contact surface and a cap outer surface.

3. The grip of claim 2, wherein the gripping member is positioned on the sleeve member adjacent the cap contact surface so as to form a cap transition across an outer surface of the gripping member and the cap outer surface, the cap transition being substantially smooth.

4. The grip of claim 2, wherein the cap and the sleeve member are integrally formed.

5. The grip of claim 2, wherein a distance from the exposed inner surface of the layer to an outer surface of the layer defines a gripping member thickness and wherein a radial distance from the mounting surface of the sleeve member to the cap outer surface defines a cap ledge thickness, the gripping member thickness adjacent the cap ledge being substantially equal to the cap ledge thickness.

6. The grip of claim 1, wherein the gripping member further comprises a woven fabric layer positioned within the polyurethane radially outward from the first fabric to enhance the stability of the grip.

7. The grip of claim 1, wherein an end of the sleeve member comprises a nipple, the nipple defining a circumferential nipple ledge extending around the sleeve member and extending radially outward from the mounting surface of the sleeve member adjacent the mounting surface, wherein the nipple ledge comprises a nipple contact surface and a nipple outer surface.

8. The grip of claim 7, wherein the gripping member is positioned on the sleeve member adjacent the nipple contact surface so as to from a nipple transition across an outer surface of the gripping member and the nipple outer surface, the nipple transition being substantially smooth.

9. The grip of claim 7, wherein the nipple and the sleeve member are integrally formed.

10. The grip of claim 7, wherein a distance from the exposed inner surface of the layer to an outer surface of the layer defines a gripping member thickness and wherein a radial distance from the mounting surface of the sleeve member to the nipple outer surface defines a nipple ledge thickness, the gripping member thickness adjacent the nipple ledge being substantially equal to the nipple ledge thickness.

11. The grip of claim 1, wherein the inner surface of the layer is rougher than an outer surface of the layer.

12. A fishing pole including the grip of claim 1.

13. A golf club including the grip of claim 1.

\* \* \* \* \*